(12) United States Patent
Ibuki

(10) Patent No.: US 9,705,797 B2
(45) Date of Patent: Jul. 11, 2017

(54) NODE IN NETWORK INCLUDING A PLURALITY OF NODES

(71) Applicant: FUJITSU LIMITED, Kawasaki-shi, Kanagawa (JP)

(72) Inventor: Jun Ibuki, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/984,985

(22) Filed: Dec. 30, 2015

(65) Prior Publication Data

US 2016/0112320 A1    Apr. 21, 2016

Related U.S. Application Data

(60) Division of application No. 14/032,750, filed on Sep. 20, 2013, now Pat. No. 9,282,042, and a continuation (Continued)

(51) Int. Cl.
*H04L 1/00* (2006.01)
*H04L 12/801* (2013.01)
*H04L 1/18* (2006.01)

(52) U.S. Cl.
CPC ............ *H04L 47/11* (2013.01); *H04L 1/1825* (2013.01); *H04L 1/1829* (2013.01); *H04L 1/1896* (2013.01); *H04L 47/12* (2013.01)

(58) Field of Classification Search
CPC ..... H04L 47/11; H04L 1/1829; H04L 1/1896; H04L 47/12

(Continued)

(56) References Cited

U.S. PATENT DOCUMENTS 6,381,241 B1 *  4/2002  Ghirnikar ............ H04L 1/1809
                                                    340/7.2
6,934,256 B1 *  8/2005  Jacobson .............. H04L 12/26
                                                    370/235

(Continued)

FOREIGN PATENT DOCUMENTS

JP        9-36896       2/1997
JP        9-284236      10/1997

(Continued)

OTHER PUBLICATIONS

Int'l Search Report of PCT/JP2011/057915 mailed Jun. 28, 2011.

(Continued)

*Primary Examiner* — Faisal Choudhury
(74) *Attorney, Agent, or Firm* — Staas & Halsey LLP

(57) ABSTRACT

In a network including a plurality of nodes, a node transmits data to another node, receives data from another node, and stores a communication history between a plurality of other nodes and the node itself. When an acknowledge response to data transmitted to a first node among the plurality of other nodes is not received, the node generates a duplicate data of the transmitted data. When a duplication report indicating detection of duplicate data transmitted to a second node among the plurality of other nodes has been received from one of the plurality of other nodes, the node refers to the communication history, and identifies the first node as a cause of generation of the duplicate data. Thereafter, the node generates a check request that include a communication history between the first node and the node itself and that requests the first node to check the communication history.

2 Claims, 34 Drawing Sheets

Related U.S. Application Data of application No. PCT/JP2011/057915, filed on Mar. 29, 2011.

(58) Field of Classification Search
USPC .......................................................... 370/236
See application file for complete search history.

(56) References Cited

U.S. PATENT DOCUMENTS

| | | | |
|---|---|---|---|
| 2001/0029188 A1* | 10/2001 | Sarkkinen | H04L 1/0001 |
| | | | 455/517 |
| 2004/0022223 A1 | 2/2004 | Billhartz | |
| 2005/0050424 A1 | 3/2005 | Matsuura | |
| 2005/0086350 A1 | 4/2005 | Mai | |
| 2006/0182128 A1 | 8/2006 | Nakata et al. | |
| 2007/0121639 A1* | 5/2007 | Degrande | H04L 1/004 |
| | | | 370/394 |
| 2007/0140194 A1* | 6/2007 | Lee | H04L 29/12264 |
| | | | 370/338 |
| 2008/0043971 A1 | 2/2008 | Barchi | |
| 2010/0284365 A1 | 11/2010 | Sundell et al. | |
| 2011/0028164 A1* | 2/2011 | Kato | H04W 8/08 |
| | | | 455/456.1 |
| 2012/0102036 A1 | 4/2012 | Parker, III et al. | |
| 2013/0268494 A1 | 10/2013 | Tahiliani et al. | |

FOREIGN PATENT DOCUMENTS

| | | |
|---|---|---|
| JP | 2003-204336 | 7/2003 |
| JP | 2005-45409 | 2/2005 |
| JP | 2005-102104 | 4/2005 |
| JP | 2005-210671 | 8/2005 |
| JP | 2005-535235 | 11/2005 |
| JP | 2006-262357 | 9/2006 |
| JP | 2007-509571 | 4/2007 |
| WO | 2005/046172 | 5/2005 |

OTHER PUBLICATIONS

IPRP & Written Opinion issued Oct. 10, 2013 in PCT/JP2011/057915.

Notice of Allowance for U.S. Appl. No. 14/032,750 dated Sep. 25, 2015.

Office Action for co-pending U.S. Appl. No. 14/985,007 dated Oct. 17, 2016.

* cited by examiner

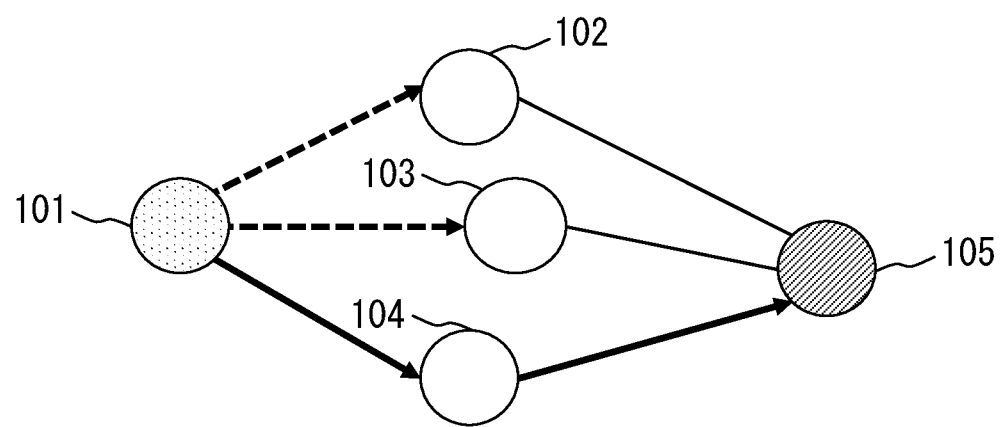
F I G. 1

| NUMBER OF TIMES | 1 | 2 | 3 | 4 | 5 | 6 | 7 | 8 | 9 |
|---|---|---|---|---|---|---|---|---|---|
| INTERVAL | T | 2T | T | T | 3T | T | T | T | T |

FIG. 3

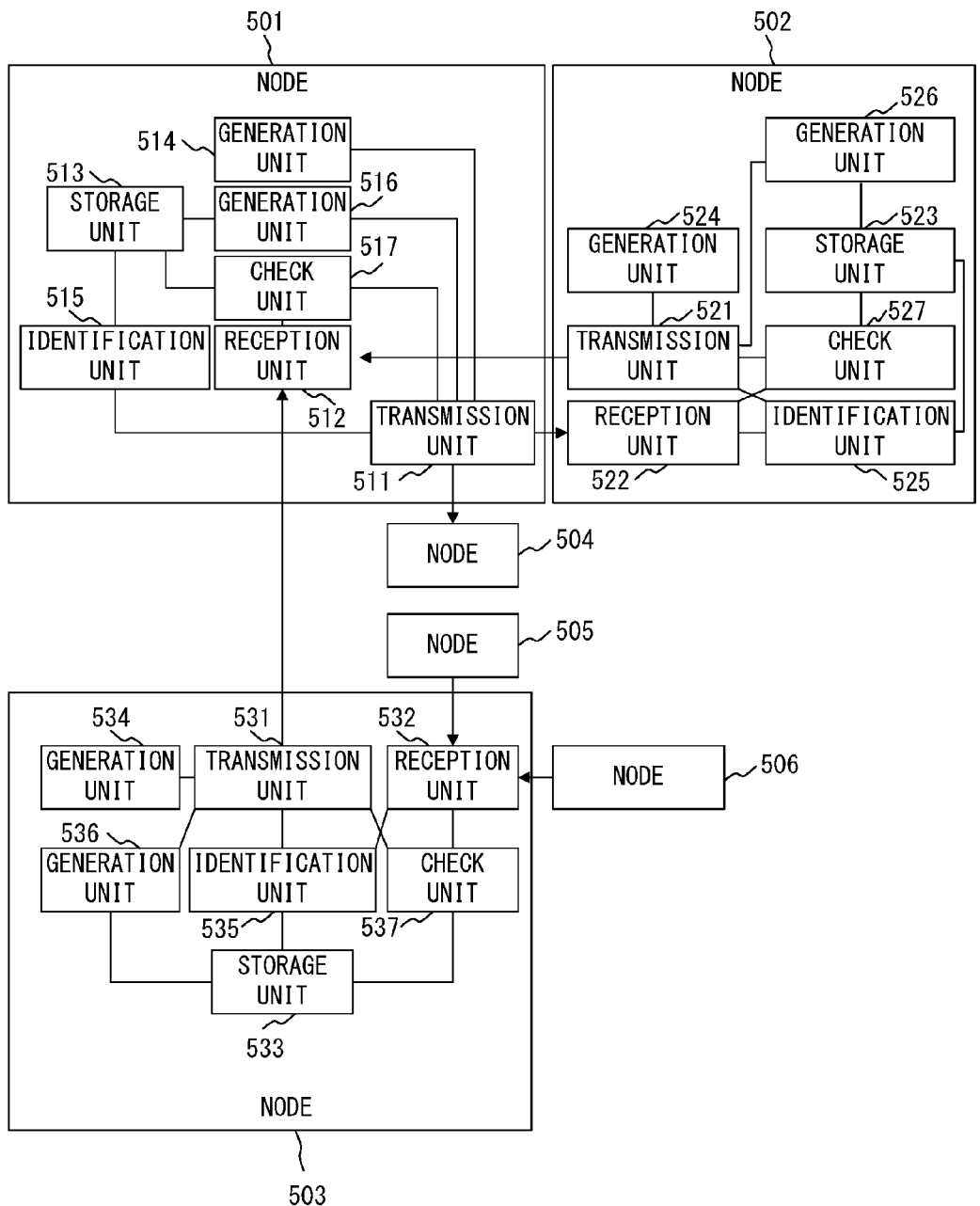
F I G. 5

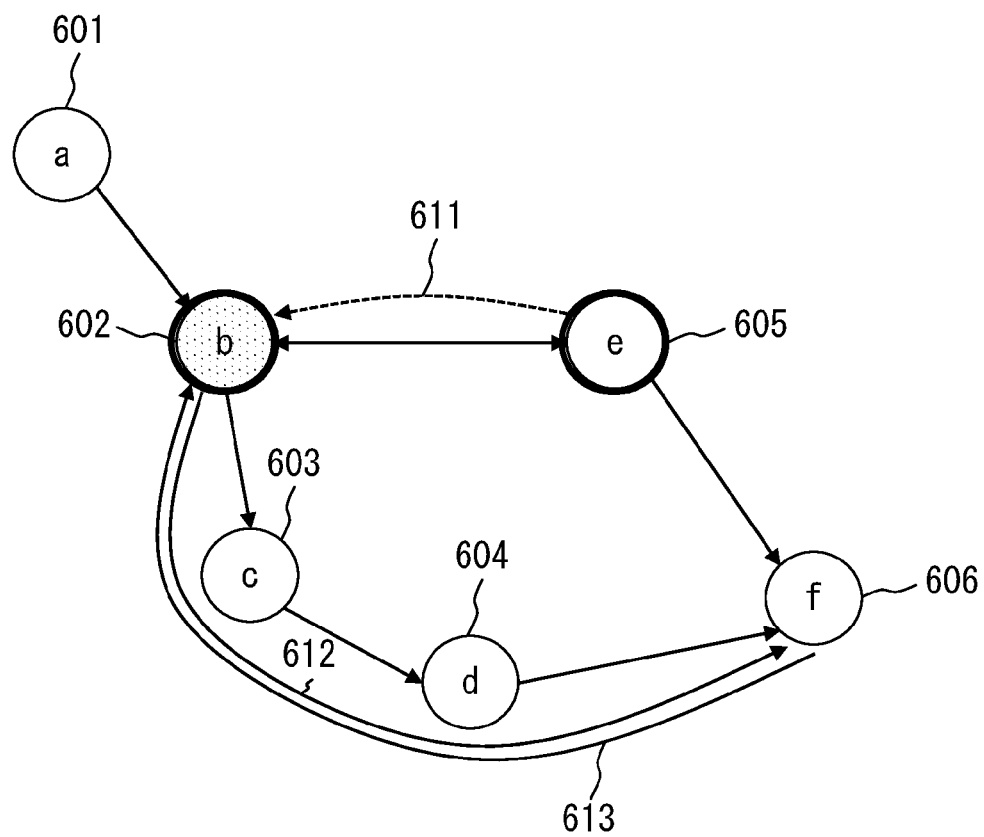
F I G. 6

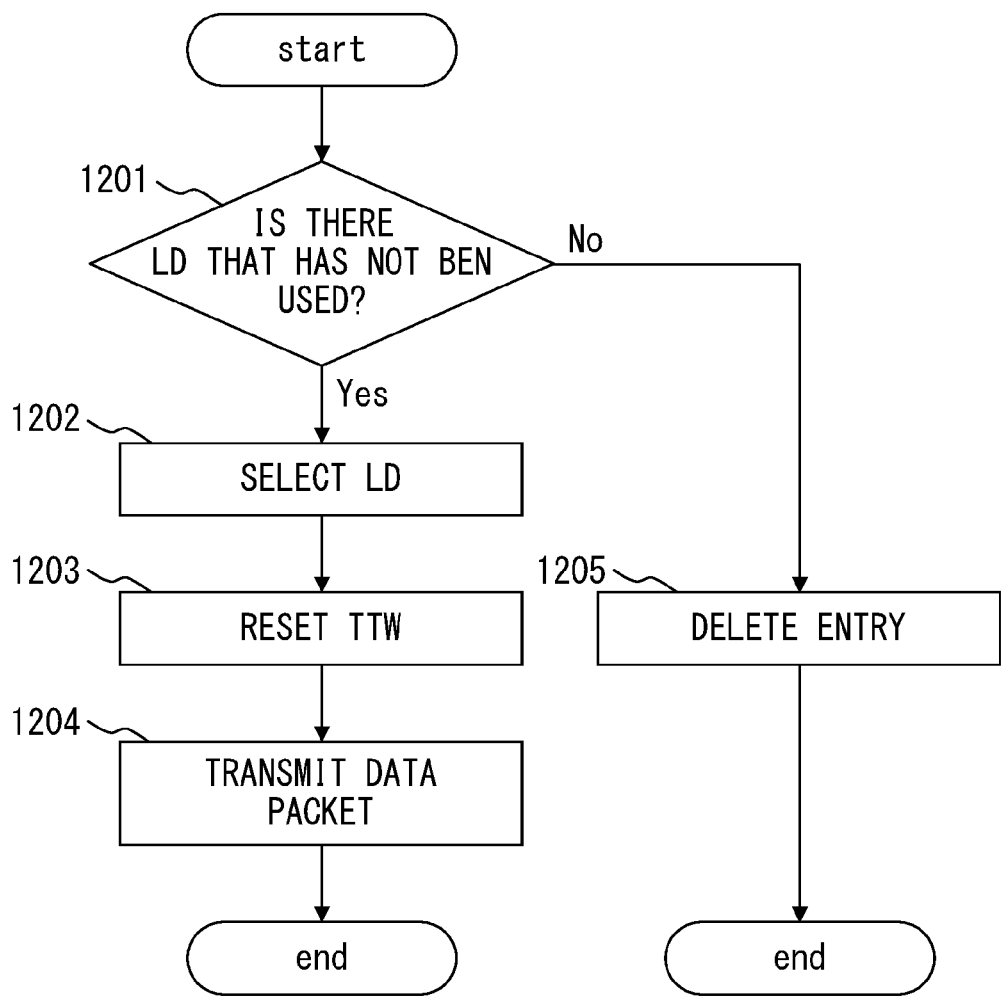
F I G. 1 2

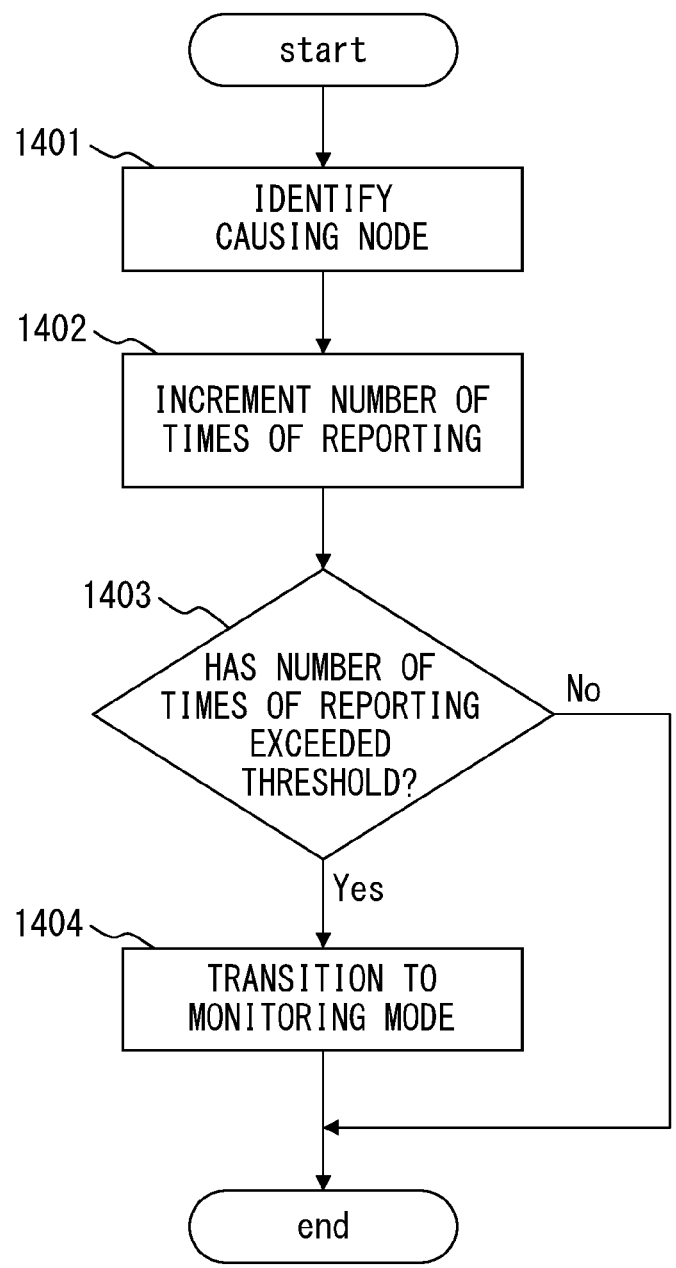
F I G. 14

| TIME | GS | FID | TTW | LD | | | | | |
|---|---|---|---|---|---|---|---|---|---|
| | | | | LD1 | | LD2 | | LD3 | |
| 3599.9999 | g | 1 | 3600.9999 | 1 | h | 0 | p | 0 | q |

F I G. 1 6

| TIME | GS | FID | TTW | LD | | | | | |
|---|---|---|---|---|---|---|---|---|---|
| | | | | LD1 | | LD2 | | LD3 | |
| 3600.9999 | g | 1 | 3601.9999 | 1 | h | 1 | p | 0 | q |

F I G. 1 7

| TIME | GS | FID | TTW | LD | | | | | |
|---|---|---|---|---|---|---|---|---|---|
| | | | | LD1 | | LD2 | | LD3 | |
| 3601.9999 | g | 1 | 3602.999 | 1 | h | 1 | p | 1 | q |

F I G. 1 8

| TIME | GS | FID | LS | LD | PACKET TYPE | PROCESS TYPE |
|---|---|---|---|---|---|---|
| 3600.0000 | a | 1 | b | e | data | TRANSMISSION |
| 3600.0001 | a | 1 | e | b | ACK | RECEPTION |
| 3600.0002 | a | 2 | b | e | data | TRANSMISSION |
| 3600.0004 | a | 2 | b | c | data | INDIRECT TRANSFER |
| ...... | ... | ... | ... | ... | ... | ... |

F I G. 1 9

| TIME | GS | FID | LS | LD | PACKET TYPE | PROCESS TYPE |
|---|---|---|---|---|---|---|
| 3600.0000 | a | 1 | b | e | data | RECEPTION |
| 3600.0001 | a | 1 | e | b | ACK | TRANSMISION |
| 3600.0002 | a | 2 | b | e | data | RECEPTION |
| 3600.0003 | a | 2 | e | b | ACK | TRANSMISSION |

F I G. 2 0

| TIME | GS | FID | ROUTE |
|---|---|---|---|
| 3599.9999 | b | 1 | b—e—f |
| 3600.0002 | a | 2 | a—b—e—f |

F I G. 2 1

| TIME | GS | FID | ROUTE |
|---|---|---|---|
| 3600.0004 | a | 2 | a—b—c—d—f |

F I G. 2 2

| TIME | GS | FID | ROUTE |
|---|---|---|---|
| 3600.0004 | a | 2 | a—b—f—c—d—f |

F I G. 2 3

| ROUTE |
|---|
| a—b—e—f |
| a—b—c—d—f |

FIG. 24

| DUPLICATING NODE | CAUSE CANDIDATE | GS | FID |
|---|---|---|---|
| b | e, c | a | 2 |

F I G. 2 5

| LINK | NUMBER OF TIMES OF REPORTING | MONITORING FLAG | TTW1 | TTW2 |
|---|---|---|---|---|
| a | 0 | 0 | — | — |
| c | 0 | 0 | — | — |
| e | 2 | 1 | xxxx.xxxx | yyyy.yyyy |

FIG. 26

| TIME | GS | FID | LS | LD | PACKET TYPE | PROCESS TYPE |
|---|---|---|---|---|---|---|
| 3600.0000 | a | 1 | b | e | data | TRANSMISSION |
| 3600.0001 | a | 1 | e | b | ACK | RECEPTION |
| 3600.0002 | a | 2 | b | e | data | TRANSMISSION |

F I G. 2 7

| LINK | NUMBER OF TIMES OF REPORTING | MONITORING FLAG | TTW1 | TTW2 |
|---|---|---|---|---|
| a | 0 | 0 | — | — |
| c | 0 | 0 | — | — |
| e | 2 | 1 | zzzz.zzzz | yyyy.yyyy |

FIG. 28

| NODE | Ack TRANSMISSION SUCCESS RATE |
|---|---|
| b | 0.5 |

F I G. 2 9

| NODE | Ack TRANSMISSION SUCCESS RATE | DATA RECEPTION SUCCESS RATE |
|---|---|---|
| b | 0.5 | 1.0 |

FIG. 30

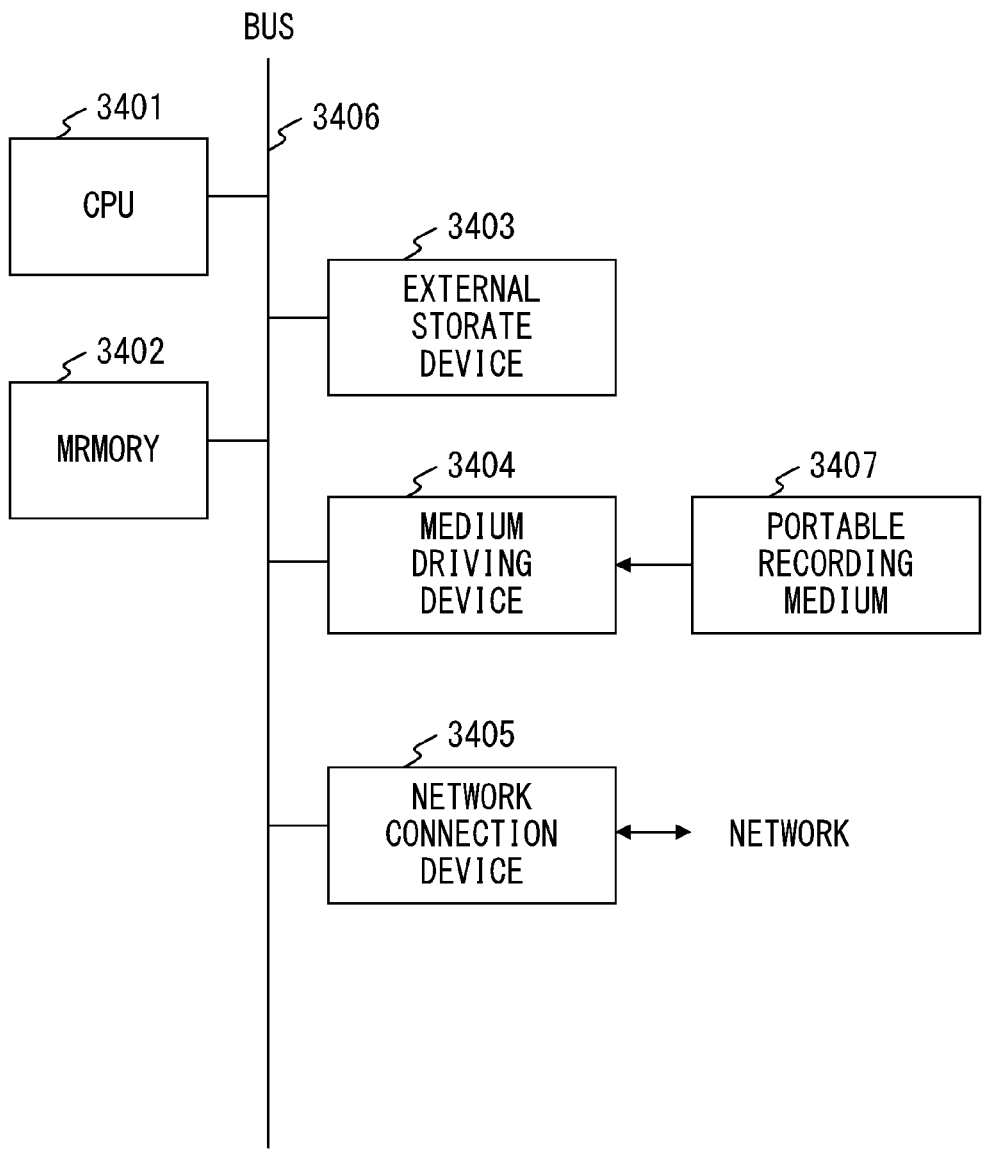
F I G. 3 4

NODE IN NETWORK INCLUDING A PLURALITY OF NODES

CROSS-REFERENCE TO RELATED APPLICATION

This application is a divisional application of U.S. application Ser. No. 14/032,750 filed Sep. 20, 2013 which is a continuation application of International Application PCT/JP2011/057915 filed on Mar. 29, 2011 and designated the U.S., the entire contents of both are incorporated herein by reference.

FIELD

The embodiments discussed herein are related to a node in a network including a plurality of nodes.

BACKGROUND

In a network having a plurality of options for a packet transfer route such as ad hoc networks, when a failure has occurred while a packet is being relayed on an optimum route that was originally selected, the packet is transferred to an alternative route.

In a communication network as illustrated in FIG. 1 for example, when a data packet is to be transferred from a node 101 to a node 105, there are three transfer routes, i.e., routes via nodes 102, 103, and 104, respectively. First, the transfer route via the node 102 is selected, and when the packet transmission from the node 101 to the node 102 has failed, the transfer route via the node 103 is selected so that the data packet is transferred from the node 101 to the node 103 as an indirect transfer.

However, when the packet transmission from the node 101 to the node 103 has also failed, the transfer route via the node 104 is selected so that the data packet is transferred from the node 101 to the node 104 as an indirect transfer. When the packet transmission from the node 101 to the node 104 has succeeded, the data packet is transmitted from the node 104 to the node 105 and the data packet reaches the node 105.

As described above, by providing an indirect transfer function to a communication network, the reachability with which data packets reach their transmission destinations can be increased even when the route data does not represent the actual condition of the communication network completely.

However, in some cases, indirect transfer functions worsen situations when there is congestion in networks. In a communication network as illustrated in FIG. 2, for example, when a data packet is to be transferred from the node 201 to the node 206, there is a route via the node 205 and a route via the nodes 203 and 204 between nodes 202 and 206.

When the transfer route via the node 205 is first selected so that the data packet is transmitted from the node 202 to the node 205, an acknowledge response (Ack) packet 211 is transmitted in return from the node 205 to the node 202. Thereafter, the data packet is transmitted from the node 205 to the node 206 so that the data packet reaches the node 206.

When the returning of the Ack packet 211 is prevented by congestion, the Ack packet 211 does not reach the node 202, and this causes an indirect transfer in which the same data packet is transferred as a duplicate packet 212 to the transfer route via the nodes 203 and 204. Thereafter, the duplicate packet 212 is transmitted from the node 204 to the node 206 so that the duplicate packet 212 reaches the node 206. No problems arise even when the node 206 receives the same data packet a plurality of times; however, repeated transmission of many duplicate packets worsens the congestion of the network.

In order to suppress duplication of data packets, methods of transmitting an Ack as described below are proposed.

(1) A method in which the transmission of an Ack is multiplexed

In this method, when a data packet is transmitted from a transmitting node to a receiving node, an Ack packet is transmitted in return from the receiving node to the transmitting node a plurality of times. Thereby, the reachability of an Ack packet increases, suppressing duplication of data packets.

(2) A method in which transmission confirmation of an Ack is performed

In this method, when a data packet is transmitted from a transmitting node to a receiving node, a first Ack packet is transmitted in return from the receiving node to the transmitting node, and subsequently a second Ack packet, indicating the reception of the first Ack packet, is transmitted in return from the transmitting node to the receiving node. When the receiving node does not receive the second Ack packet, the first Ack packet is retransmitted from the receiving node to the transmitting node. Thereby, the reachability of first Ack packets increases, suppressing duplication of data packets.

(3) A method in which the transmission power of an Ack is adjusted

In this method, when a data packet is transmitted from a transmitting node to a receiving node, an Ack packet is transmitted in return with increased transmission power from the receiving node to the transmitting node. Thereby, the reachability of first Ack packets increases, suppressing duplication of data packets.

A method is known in which the link quality is evaluated by calculating the transmission success rate between nodes included in a communication network in order to detect congestion in the communication network. However, it is difficult to determine a success and failure of transmission on the basis of measurement in the receiving node alone unless the number of times of transmitting data packets and Ack packets and their transmission timings are known, because they are transmitted unperiodically. Accordingly, the transmission success rate is calculated on the basis of the fluctuation of arrival cycles of Hello packets, which are transmitted periodically.

A case is discussed as an example in which the intervals at which one node receives the first through ninth Hello packets are measured and the measurement results as illustrated in FIG. 3 are obtained. In this example, the second and fifth reception intervals are 2T and 3T, respectively, which are longer than other reception intervals. In such a case, it can be estimated that missing Hello packets due to transmission failures have elongated the reception intervals, and accordingly the transmission success rate can be calculated on the basis of the measurement results of the reception intervals.

A technique is also known in which a wireless data communication system makes the transmission device record transmission time and the transmitted contents and also makes the reception device record the reception time and the received contents so that the recorded contents are analyzed in order to determine whether or not the transmission device and the reception device were operating normally when a failure occurred in communication.

A technique is also known in which, in a mobile communication network, a transmitting node transmits a measurement packet stream periodically and a receiving node transmits the measurement values of packet delay to the transmitting node so that the state information of each route is updated.

A technique is also known in which, in a mobile ad hoc network, link quality is measured on the basis of a packet error rate in order to determine a route on the basis of the measurement result.

Patent Document 1: Japanese Laid-open Patent Publication No. 9-284236

Patent Document 2: Japanese Laid-open Patent Publication No. 2005-210671

Patent Document 3: Japanese Laid-open Patent Publication No. 2005-535235

SUMMARY

According to an aspect of the embodiments, a node in a network including a plurality of nodes includes a transmission unit, a reception unit, a memory, and a processor.

The transmission unit transmits data to another node. The reception unit receives data from another node. The memory stores a communication history between a plurality of other nodes and the node including the memory. The processor generates, when an acknowledgement response to data transmitted to a first node among the plurality of other nodes is not received from the first node, duplicate data of the transmitted data. The processor refers to the communication history, identifies the first node as a cause of generation of the duplicate data, and generates a check request that includes a communication history between the first node and the node including the memory and that requests the first node to check the communication history when a duplication report indicating detection of the duplicate data transmitted to a second node among the plurality of other nodes is received from one of the plurality of other nodes.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a first communication network;
FIG. 3 illustrates reception intervals of Hello packets;
FIG. 5 illustrates a configuration of a communication system;
FIG. 6 illustrates a third communication network;
FIG. 12 is a flowchart for a data packet retransmission process;
FIG. 14 is a flowchart for a duplication report packet reception process;
FIG. 16 illustrates a first data management table;
FIG. 17 illustrates a second data management table;
FIG. 18 illustrates a third data management table;
FIG. 19 illustrates a first communication history table;
FIG. 20 illustrates a second communication history table;
FIG. 21 illustrates a fourth data management table;
FIG. 22 illustrates a first data packet;
FIG. 23 illustrates a second data packet;
FIG. 24 illustrates a comparison between routes;
FIG. 25 illustrates a duplication report packet;
FIG. 26 illustrates a first link table;
FIG. 27 illustrates a communication history included in a check request packet;
FIG. 28 illustrates a second link table;
FIG. 29 illustrates a first Ack transmission evaluation table;
FIG. 30 illustrates a second Ack transmission evaluation table;
FIG. 34 illustrates a configuration of an information processing apparatus.

DESCRIPTION OF EMBODIMENTS

The above described methods of responding to a transmitting node when a receiving node has received data in conventional communication networks have the following problems.

It is possible to select the most appropriate method of transmitting an Ack from among (1) a method in which transmission of an Ack is multiplexed, (2) a method in which a transmission confirmation of an Ack is performed, and (3) a method in which the transmission power of an Ack is adjusted, and to select parameters such as the number of times of transmitting an Ack, the transmission power of an Ack, and the like, by taking into consideration the capacity reduction in the communication network and worsening of congestion caused by duplicate packets. In such a case, large-scale simulation is performed in order to set the most appropriate method of transmitting an Ack and the most appropriate parameters in the entire communication network.

In methods (1) and (2) of transmitting an Ack, an Ack packet is transmitted a plurality of number of times, and accordingly the traffic on a communication network is larger than a case where an Ack packet is transmitted in return only once. This may accelerate congestion, and it is considered that the normal operation capacity of the communication network is occupied unnecessarily, imposing loads on the communication network.

In method (1) or (3) of transmitting an Ack, when congestion has become worse due to some factor, the transmission success rate of an Ack packet is decreased, arousing a possibility that duplicate packets will be generated. Therefore, it is difficult to prevent duplicate packets completely although it is possible to reduce duplicate packets.

Also, in the method in which the transmission success rate is calculated by using hello packets, it is difficult to detect the fact that congestion has worsened the transmission success rate. The traffic of Hello packets is distributed to respective nodes almost evenly; however, the traffic of data packets concentrates around a particular node such as a gateway, leading to a tendency to have cases where the transmission success rate worsens only around such a particular node.

Figure 2:
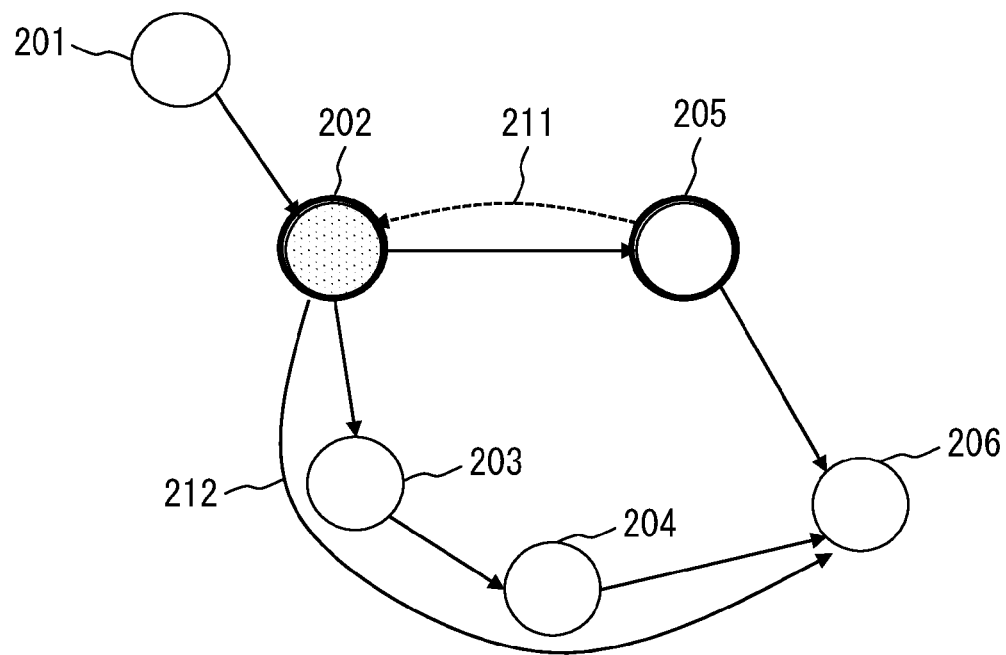
FIG. 2 illustrates a second communication network.
Figure 4:
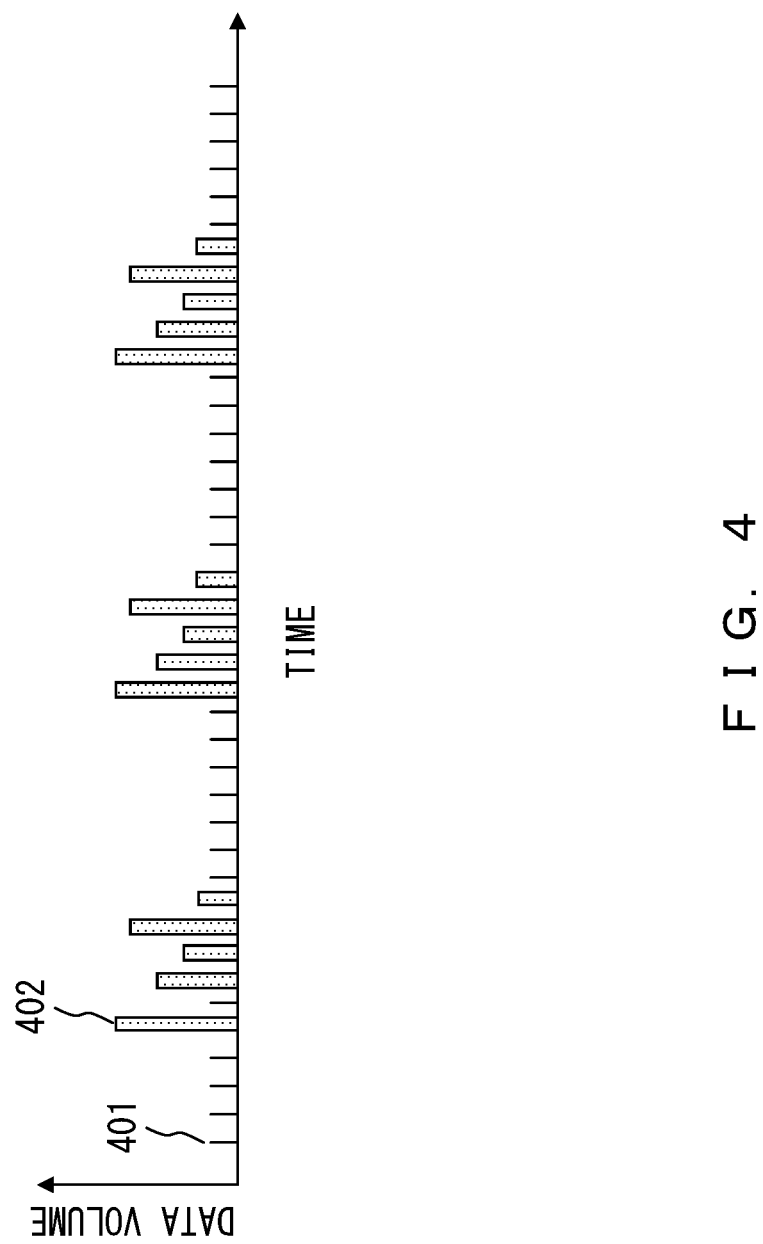
FIG. 4 illustrates temporal changes in data volumes of Hello packets and data packets.

Further, Hello packets are transmitted on a consistent cycle without intermissions, each of them being transmitted independently as illustrated in FIG. 4, and accordingly a data volume 401 of hello packets are distributed along the time axis. By contrast, data packets are transmitted during limited periods, and because relaying of packets and transmission of Ack packets are performed continuously, a data volume 402 of data packets tends to concentrate on a particular period.

As described above, it is difficult to detect congestion in a communication network by calculating the transmission success rate on the basis of Hello packets, which have different characteristics from those of data packets.

This problem arises not only in ad hoc networks but also in other networks that have a plurality of nodes.

Hereinafter, embodiments will be explained in detail by referring to the drawings.

FIG. 5 illustrates a configuration example of a communication system according to an embodiment. The communication system illustrated in FIG. 5 includes nodes 501 through 506 in a communication network, and the nodes 501 through 506 perform communications with other nodes in a wireless or wired manner.

The nodes 501 and 502 may also be referred to as a duplicating node and a causing node, respectively. A duplicating node is a node that generates duplicate data of transmitted data when an acknowledge response to data transmitted to another node has not been received from that node.

The node 501 includes a transmission unit 511, a reception unit 512, a storage unit 513, generation units 514 and 516, an identification unit 515, and a check unit 517.

The transmission unit 511 transmits data to another node. The reception unit 512 receives data from another node. The storage unit 513 stores a communication history between the node 501 and a plurality of other nodes. The generation unit 514 generates duplicate data of transmitted data when an acknowledge response to data transmitted to the node 502 has not been received from the node 502. The transmission unit 511 transmits the duplicate data to a node 504.

The reception unit 512 receives a duplication report indicating that duplicate data has been detected from a node 503. When the duplication report has been received, the identification unit 515 refers to the communication history, and identifies the node 502 as the cause of the duplicate data. The generation unit 516 generates a check request that includes a communication history between the nodes 501 and 502 and that requests the node 502 to check the communication history. The transmission unit 511 transmits the check request to the node 502.

The node 502 includes a transmission unit 521, a reception unit 522, a storage unit 523, generation units 524 and 526, an identification unit 525, and a check unit 527.

The storage unit 523 stores a communication history between the node 502 and a plurality of other nodes. The transmission unit 521 transmits to the node 501 an acknowledge response to data received from the node 501. The reception unit 522 receives from the node 501 a check request that includes the communication history between the nodes 501 and 502 and that requests to check communication history.

When the check request has been received, the check unit 527 collates the communication history included in the check request with the communication history between the nodes 501 and 502 that is stored in the storage unit 523. When the node 501 has not received from the node 502 an acknowledge response to the data transmitted from the node 501 to the node 502, the check unit 527 changes the method of responding to the node 501.

The node 503 includes a transmission unit 531, a reception unit 532, a storage unit 533, generation units 534 and 536, an identification unit 535, and a check unit 537.

The storage unit 533 stores a communication history between the node 503 and a plurality of other nodes. The reception unit 532 receives first data from the node 505. When the first data has been received, the identification unit 535 refers to the communication history so as to check whether one of the first data and second data received from the node 506 is duplicate data of the other of them. When one of them is duplicate data of the other, the identification unit 535 identifies the node 501 that generated the duplicate data. The transmission unit 531 transmits to the node 501 a duplication report indicating that duplicate data is detected.

In the communication system illustrated in FIG. 5, a duplicating node (node 501) is identified when duplicate data is detected in the node 503, and the duplicating node requests the causing node (node 502) to check the communication history. Then, in the causing node, the communication history of the duplicating node is collated with the communication history of the causing node, and the method of responding from the causing node to the duplicating node is changed.

As described above, a duplicating node and a causing node are identified so that the response method is changed, reliably suppressing the generation of duplicate data. Also, response methods between all nodes are not changed by exchanging communication histories between all nodes in a communication network, and instead, a duplicating node transmits a communication history to a causing node so that only the method of responding from the causing node to the duplicating node is changed, suppressing loads imposed on the communication network for suppressing duplicate data.

FIG. 6 illustrates an example of a communication network according to an embodiment. The communication network illustrated in FIG. 6 includes nodes 601 through 606, and has a plurality of options as a packet transfer route. The pieces of identification information (node IDs) of the nodes 601 through 606 are a, b, c, d, e, and f, respectively.

Figure 7:
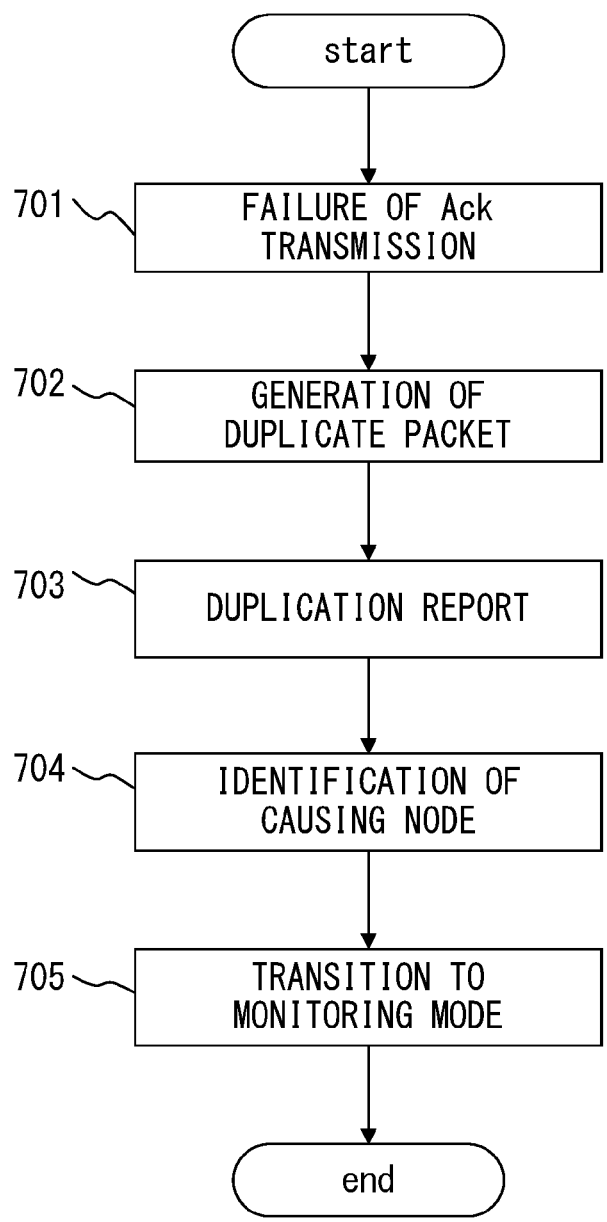
FIG. 7 is a flowchart of operations in a normal mode.

FIG. 7 is a flowchart explaining an example of an operation in a normal mode of the communication network illustrated in FIG. 6. When a data packet is to be transferred from the node 601 to the node 606, there is a transfer route via the node 605 and a transfer route via nodes 603 and 604 between the nodes 602 and 606.

When the transfer route via the node 605 is first selected so that the data packet is transmitted from the node 602 to the node 605, an Ack packet 611 is transmitted in return from the node 605 to the node 602. Thereafter, the data packet is transmitted from the node 605 to the node 606 so that the data packet reaches the node 606.

When the return of the Ack packet 611 has failed due to congestion (step 701), the Ack packet 611 does not reach the node 602, and this causes a situation where the same data packet is transferred as a duplicate packet 612 to a transfer route that goes via the nodes 603 and 604 as indirect transfer (step 702). Thereafter, the duplicate packet 612 is transmitted from the node 604 to the node 606 so that the duplicate packet 612 reaches the node 606.

The node 606 detects that the duplicate packet 612 is a duplication of the data packet that was received from the node 605. Then, a duplication report packet 613 indicating that the duplicate packet 612 has been detected is transmitted to the node 602 (duplicating node), which generated the duplicate packet 612 (step 703).

The node 602 refers to the communication history between the node 602 and an adjacent node so as to identify the node 605 (causing node), which caused the generation of the duplicate packet 612, and counts the number of times that the duplication report packet 613 was received for each causing node (step 704). When the counted value of a causing node has exceeded a threshold, the node 602 transitions to the monitoring mode (step 705).

Figure 8:
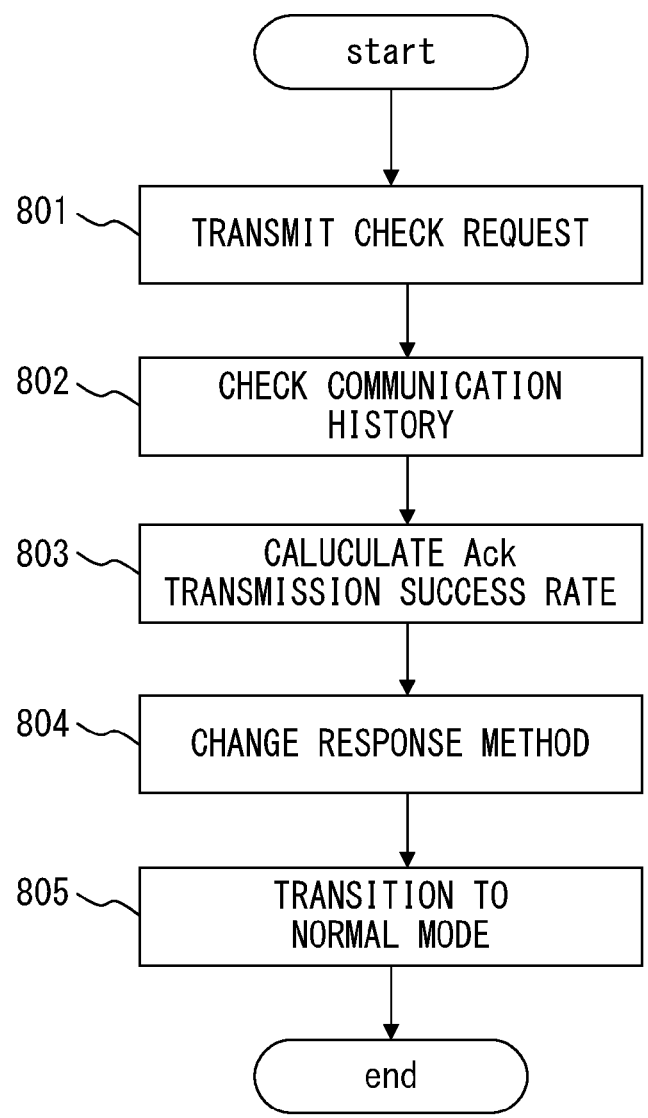
FIG. 8 is a flowchart of operations in a monitoring mode.
Figure 9:
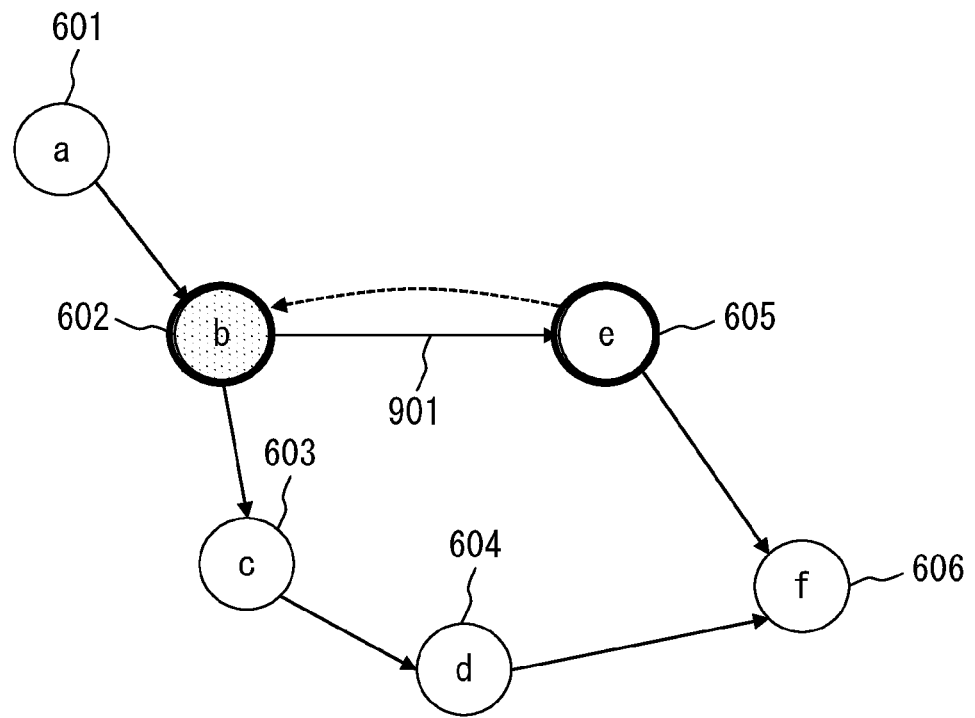
FIG. 9 illustrates transmission of a check request packet.

FIG. 8 is a flowchart explaining an example of an operation in a monitoring mode of the communication network illustrated in FIG. 6. As illustrated in FIG. 9, the node 602 periodically transmits a check request packet 901 to the node 605 (step 801). The check request packet 901 includes the communication history between the nodes 602 and 605.

From the communication history included in the check request packet 901, the node 605 extracts a record indicating that the node 602 received Ack packets from the node 605. Also, from the communication history between the nodes 602 and 605 stored in the node 605, the node 605 extracts a record indicating that the node 605 transmitted Ack packets to the node 602. Thereafter, the two extracted records are collated (step 802), and the transmission success rate of Ack packets is calculated (step 803).

Next, when the obtained transmission success rate is lower than a threshold, the node 605 changes the method of responding to the node 602 in such a manner that the transmission success rate increases (step 804). The nodes 602 and 605 repeat the operations of steps 801 through 804, and the nodes transition to the normal mode (step 805) when a prescribed period of time has elapsed since the operation of the monitoring mode started. It is also possible to transition to the normal mode when a prescribed period of time has elapsed after the transmission success rate of Ack packets has become equal to or higher than the threshold.

Although the communication network illustrated in FIG. 6 has six nodes, a communication network according to an embodiment may have five nodes or fewer or seven nodes or more.

Next, explanations in more detail will be given for configurations and operations of each node according to an embodiment.

Figure 10:
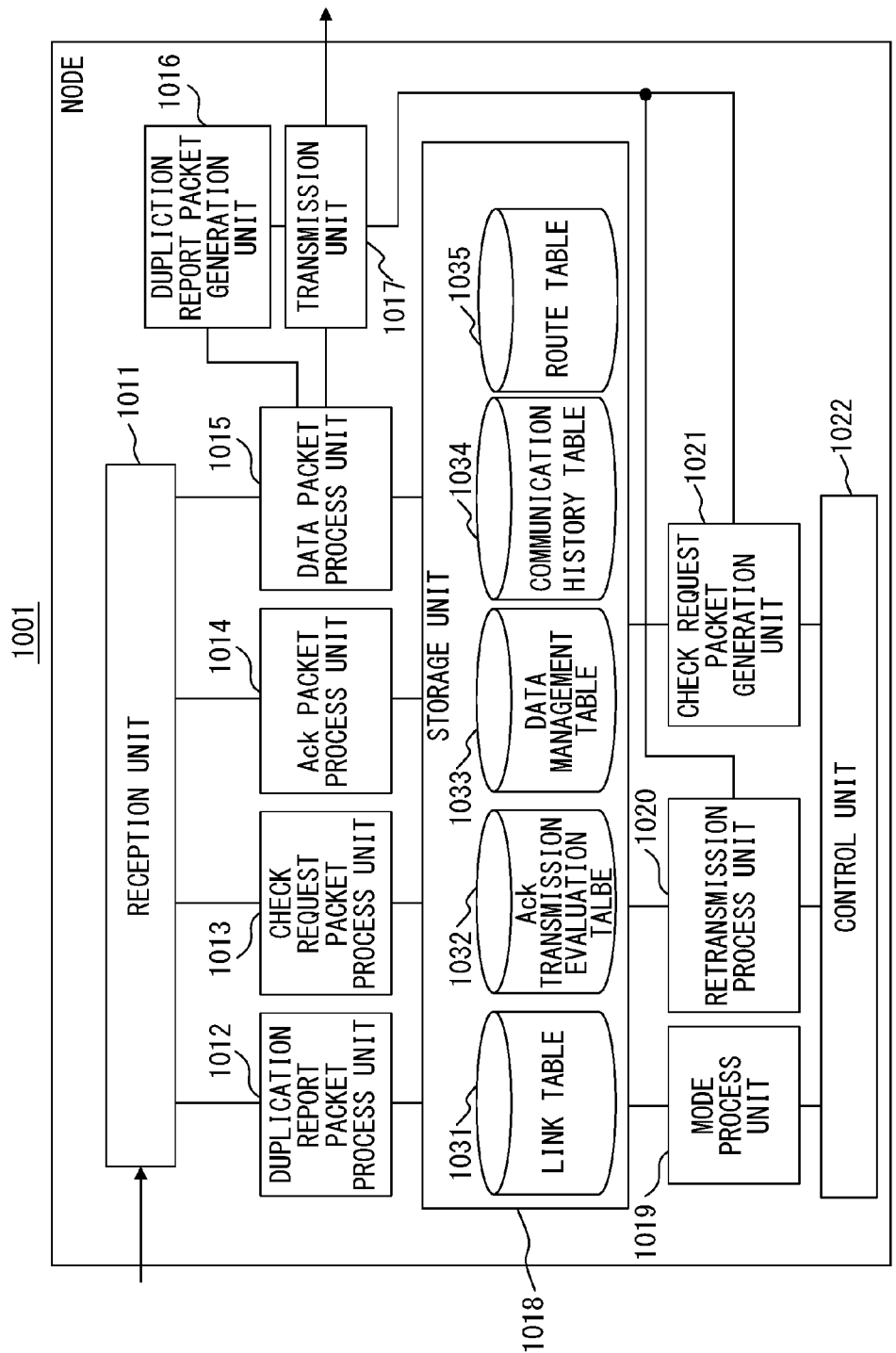
FIG. 10 illustrates a configuration of a node.

FIG. 10 illustrates a configuration example of a node 1001 that corresponds to each node included in a wired or wireless communication network. The node 1001 illustrated in FIG. 10 corresponds to each of the nodes 501 through 506 illustrated in FIG. 5 and to each of the nodes 601 through 606 illustrated in FIG. 6.

The node 1001 includes a reception unit 1011, a duplication report packet process unit 1012, a check request packet process unit 1013, an Ack packet process unit 1014, a data packet process unit 1015, a duplication report packet generation unit 1016, and a transmission unit 1017. The node 1001 further includes a storage unit 1018, a mode process unit 1019, a retransmission process unit 1020, a check request packet generation unit 1021, and a control unit 1022.

The storage unit 1018 stores a link table 1031, an Ack transmission evaluation table 1032, a data management table 1033, a communication history table 1034, and a route table 1035.

In the link table 1031, for each link between the node 1001 and an adjacent node, the number of times of receiving a duplication report packet to identify the adjacent node as the causing node, a flag representing whether or not the node 1001 has transitioned to the monitoring mode, TTW1, TTW2, and the like are recorded. In the Ack transmission evaluation table 1032, for each adjacent node or link that is the transmission destination of an Ack packet, the transmission success rate of Ack packets, the reception success rate of data packet, and the like are recorded.

The communication history table 1034 records a communication history of packets that were transmitted or received. The communication history table 1034 records, for each packet that was transmitted or received, the transmission time or the reception time, the node ID of the global source (GS) node, the frame ID (FID), the node ID of the local source (LS) node, and the node ID of the local destination (LD). The communication history table 1034 further records the packet type, the process type, and the like.

The data management table 1033 records a communication history of data packets among packets recorded in the communication history table 1034. The data management table 1033 records, for each data packet that was transmitted or received, the transmission time or the reception time, the node ID of the GS, the FID, the TTW, the node ID of the LD, the route, and the like.

The route table 1035 records route information including an LD that the node 1001 can use as the packet transmission destination.

An FID is identification information of a packet, a GS corresponds to a node that sent out a packet for the first time, an LS corresponds to an adjacent node that sent out a reception packet, and an LD corresponds to a node adjacent to the transmission destination of a transmission packet. A packet type represents the type of a packet, such as a data packet, an Ack packet or the like, and a process type represents the type of process performed on a packet, such as transmission, reception, indirect transfer, and the like.

A TTW is set in the data management table 1033 when a data packet is transmitted, and represents the time obtained by adding the Ack waiting time to the time when the TTW was set. A TTW1 is set in the link table 1031 when the node 1001 has transitioned to the monitoring mode and when the transmission success rate of Ack packets has been determined to be lower than a threshold in the monitoring mode. The TTW1 represents a time obtained by adding the check interval to the time when the TTW1 was set. A TTW2 is set when the node 1001 has transitioned to the monitoring mode, and represents a time obtained by a monitoring mode continuation time to the time when the TTW2 was set.

The reception unit 1011 receives a packet from an adjacent node through a link. The duplication report packet process unit 1012 performs a process that is to be performed when a duplication report packet has been received, the check request packet process unit 1013 performs a process to be performed when a process check request packet has been received, and the Ack packet process unit 1014 performs a process to be performed when an Ack packet has been received.

The data packet process unit 1015 detects a duplicate packet from received data packets, and the duplication report packet generation unit 1016 generates, when a duplicate packet has been detected, a duplication report packet directed to the duplicating node. The transmission unit 1017 transmits a data packet, an Ack packet, and the like to an adjacent node through a link.

The mode process unit 1019 cancels the monitoring mode, and performs a process of making the mode transition to the normal mode, and when an Ack packet has not been received from a node adjacent to the data packet transmission destination, the retransmission process unit 1020 performs a process of retransmitting a data packet to a another adjacent node. The check request packet generation unit 1021 generates a check request packet in the monitoring mode. The control unit 1022 operates in accordance with a timer event, and requests the mode process unit 1019, the retransmission process unit 1020, or the check request packet generation unit 1021 to perform necessary processes.

The reception unit 1011 corresponds to the reception units 512, 522, and 532 in FIG. 5, and the duplication report packet process unit 1012 corresponds to the identification units 515, 525, and 535. The check request packet process unit 1013 corresponds to the check units 517, 527, and 537, and the data packet process unit 1015 corresponds to the identification units 515, 525, and 535. The transmission unit 1017 corresponds to the transmission units 511, 521, and 531, and the storage unit 1018 corresponds to the storage units 513, 523, and 533. The retransmission process unit 1020 corresponds to the generation units 514, 524, and 534, and the check request packet generation unit 1021 corresponds to the generation units 516, 526, and 536.

Figure 11:
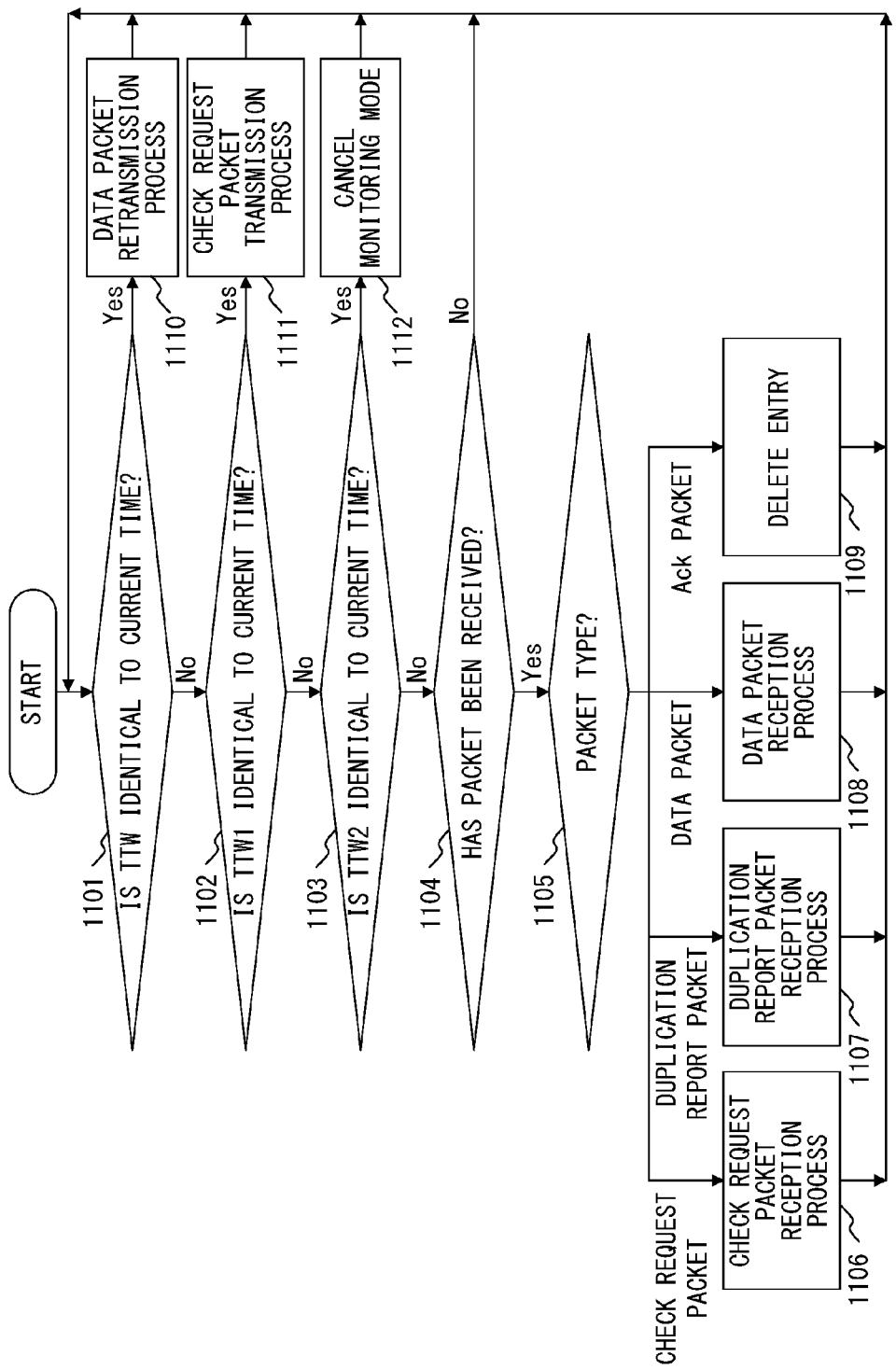
FIG. 11 is a flowchart for a communication process.

FIG. 11 is a flowchart explaining an example of a communication process performed by the node 1001, and FIGS. 12 through 15 are flowcharts explaining examples of the processes in steps 1110, 1108, 1107, and 1106 in FIG. 11, respectively. The communication process in FIG. 11 starts at constant time intervals as timer events.

First, the control unit 1022 obtains the current time from the timer, and compares the current time with the TTW recorded in each entry of the data management table 1033 (step 1101). When there is an entry identical to the current time (YES in step 1101), it is recognized that the Ack waiting time has elapsed without receiving an Ack packet from the transmission destination of the corresponding data packet. In such a case, the control unit 1022 requests the retransmission process unit 1020 to perform data packet retransmission (step 1110).

When there are no entries that have a TTW identical to the current time (NO in step 1101), the control unit 1022 compares the current time with the TTW1 recorded in each entry of the link table 1031 (step 1102). When there is an entry having the TTW1 identical to the current time (YES in step 1102), the current time is a time for requesting the causing node to check the communication history, and accordingly the control unit 1022 requests the check request packet generation unit 1021 to perform a check request packet transmission process (step 1111). The check request packet generation unit 1021 generates a check request packet, and the transmission unit 1017 transmits a check request packet to the causing node.

When there are no entries having a TTW1 identical to the current time (NO in step 1102), the control unit 1022 compares the current time with the TTW2 recorded in each entry of the link table 1031 (step 1103). When there is an entry having a TTW2 identical to the current time (YES in step 1103), the current time is a time for terminating the monitoring mode, and accordingly the control unit 1022 requests the mode process unit 1019 to cancel the monitoring mode (step 1112). The mode process unit 1019 updates the link table 1031 so as to cancel the monitoring mode, and the node 1001 transitions to the normal mode.

When there are no entries having a TTW2 identical to the current time (NO in step 1103), the control unit 1022 terminates the process. Next, the reception unit 1011 checks whether or not a packet has been received from either adjacent node (step 1104). When a packet has not been received, the processes in and subsequent to step 1101 are repeated, and when a packet has been received, the control unit 1022 checks the type of that packet (step 1105).

When the type of the packet is a check request packet, the control unit 1022 requests the check request packet process unit 1013 to perform a check request packet reception process (step 1106). When the type of the packet is a duplication report packet, the control unit 1022 requests the duplication report packet process unit 1012 to perform a duplication report packet reception process (step 1107).

When the type of the packet is a data packet, the control unit 1022 requests the data packet process unit 1015 to perform a data packet reception process (step 1108). When the type of the packet is an Ack packet, the control unit 1022 requests the Ack packet process unit 1014 to update the data management table 1033 (step 1109). Thereafter, the Ack packet process unit 1014 deletes the entry of the corresponding data packet from the data management table 1033.

When the processes in steps 1110 through 1112 or 1106 through 1109 are terminated, the processes in and subsequent to step 1101 are repeated.

FIG. 12 is a flowchart explaining an example of a data packet retransmission process performed by the retransmission process unit 1020 in step 1110 in FIG. 11.

The retransmission process unit 1020 refers to the data management table 1033, and checks whether or not there is an LD that has not been used among a plurality of LDs recorded in an entry having a TTW identical to the current time (step 1201).

FIG. 16 illustrates an example of an entry in the data management table 1033. In this example, information of the transmission time of a data packet, the node ID of the GS, the FID, the TTW, and the LD is depicted from among pieces of information included in an entry. The information of LD includes use flags and node IDs of LD1 through LD3.

LD1 through LD3 correspond to a plurality of nodes that the node 1001 can use as LDs, their node IDs are h, p, and q, respectively, and their use flags are logics "1", "0", and "0", respectively. When a use flag is "1", this represents that the corresponding LD has been used, and when a use flag is "0", this represents that the corresponding LD has not been used.

In FIG. 16, the use flag of LD1 has been set to "1", and accordingly it is recognized that a data packet has been transmitted to node h. When the current time has become 3600.9999, which is recorded as a TTW, it is checked whether or not there are LDs that have not been used from among LD1 through LD3.

When there are LDs that have not been used (YES in step 1201), the retransmission process unit 1020 selects one of those LDs, and updates the use flag of the selected LD to "1" (step 1202). Next, the retransmission process unit 1020 resets, to the TTW of that entry, the time obtained by adding the Ack waiting time to the current time (step 1203). Thereafter, the retransmission process unit 1020 generates a data packet having the same data as the transmitted data packet that corresponds to that entry, and requests the transmission unit 1017 to retransmit the data packet to the selected LD (step 1204). The transmission unit 1017 transmits the requested data packet to the requested LD.

When, for example, LD2 in FIG. 16 has been selected, the use flag of LD2 is changed to "1" as illustrated in FIG. 17, and a data packet is retransmitted to node p.

Thereafter, when, in step 1101 in FIG. 11, the current time is identical to the TTW that has been reset, LD3 is selected as the retransmission destination. Then, as illustrated in FIG. 18, the use flag of LD3 is changed to "1", and a data packet is retransmitted to node q.

When there are no LDs that have been unused among a plurality of LDs recorded in an entry having a TTW identical to the current time (NO in step 1201), the retransmission process unit 1020 deletes that entry from the data management table 1033 (step 1205).

Figure 13:
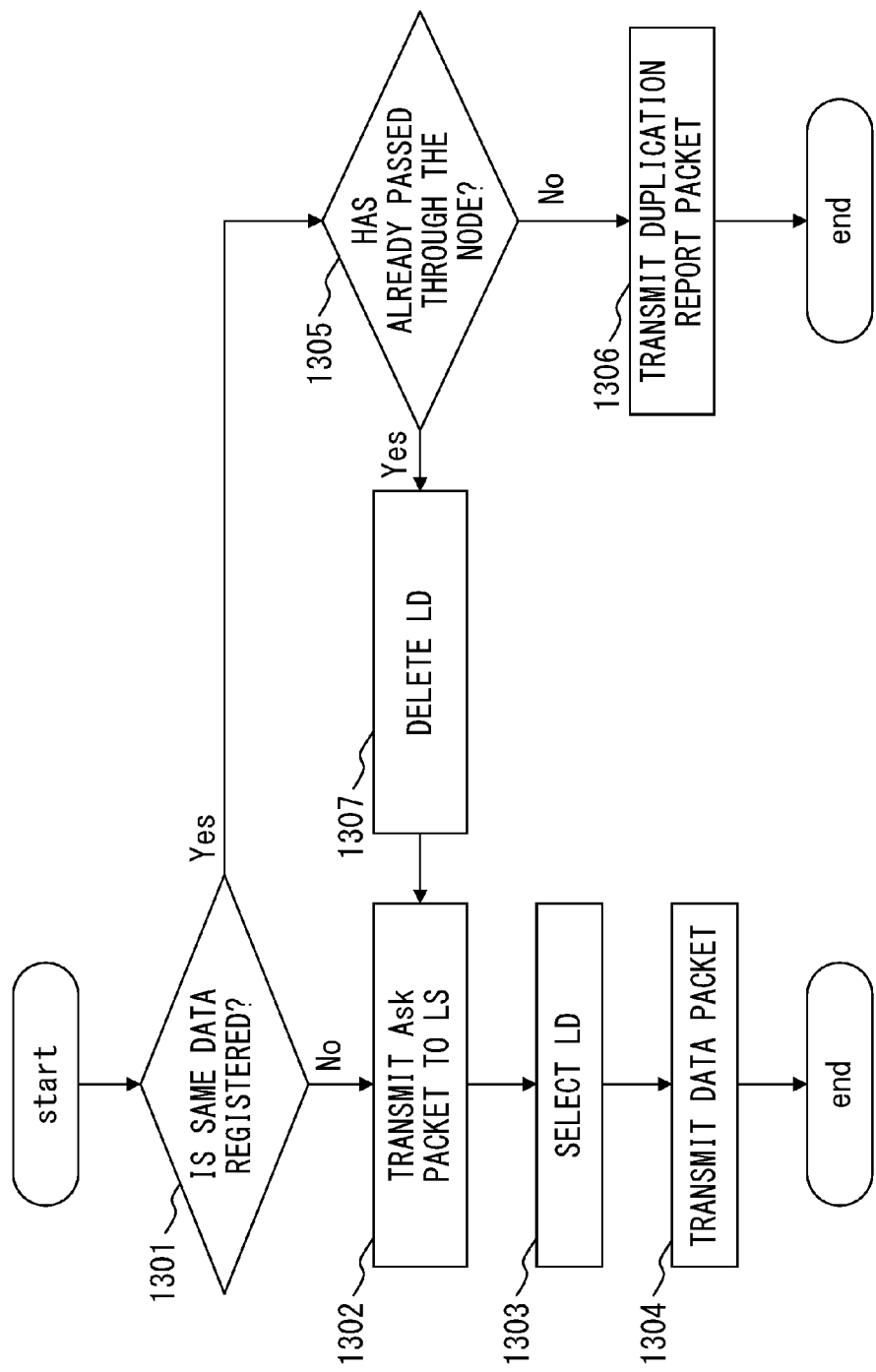
FIG. 13 is a flowchart for a data packet reception process.

FIG. 13 is a flowchart explaining an example of a data packet reception process performed by the data packet process unit 1015 in step 1108 in FIG. 11.

The data packet process unit 1015 refers to the data management table 1033 or the communication history table 1034 so as to check whether or not the same data packet as the received data packet is registered (step 1301).

FIG. 19 and FIG. 20 respectively illustrate examples of entries in the communication history table 1034 stored in the node 602 (node b) and the node 605 (node e) in FIG. 6. Each node stores, in the communication history table 1034, transmission or reception records of past n packets for which the process has been terminated. "n" represents an integer equal to or greater than one, and may be set beforehand or may be set in accordance with the current communication conditions.

The examples in FIGS. 19 and 20 illustrate packet transmission time or packet reception time, node ID of GS, FID, node ID of LS, node ID of LD, packet type, and process type from among pieces of information included in an entry.

These communication histories illustrate that an Ack packet having "1" as the FID was transmitted from node e to node b in return for a data packet having "1" as the FID transmitted from node b to node e. However, an Ack packet transmitted in return for a data packet having "2" as the FID that was transmitted from node b to node e did not reach node e, and accordingly a data packet was transmitted from node b to node c as an indirect transfer.

Therefore, it is possible to recognize that the data packet having "2" as the FID transmitted from node b to node e and the data packet having "2" as the FID transmitted from node b to node c as an indirect transfer are the same packets.

As illustrated in FIG. 6, the data packet transmitted to node e is received by the node 606 (node f), and the data packet transmitted to node c as an indirect transfer (duplicate packet 612) is also received by node f. In node f, the data packet that was received first between the two data packets is first registered in the communication history table 1034. Accordingly, by comparing the GS and FID of the data packet received later with the GS and FID of the data packet registered in the communication history table 1034, it is possible to check whether or not the same data packet as the data packet received currently is registered.

As described above, the communication history of data packets registered in the communication history table 1034 is registered in the data management table 1033. Accordingly, even when the data management table 1033 is used instead of the communication history table 1034, it is possible to check whether or not the same data packet as a received data packet is registered.

FIG. 21 illustrates an example of entries in the data management table 1033 stored in node f. In this example, the transmission time or the reception time of data packet, node ID of GS, FID, and route are presented from among pieces of information included in an entry. A route is information in which node IDs of one or more nodes that the received data packet has passed through after being transmitted from the GS and before reaching the node f are arranged in the order of the passing through. For example, it can be recognized that the data packet having "2" as the FID reached node f after being transmitted from node a via nodes b and e.

When node f receives the duplicate packet 612 as illustrated in FIG. 22 from node d in this situation, the data packet process unit 1015 refers to the data management table 1033 illustrated in FIG. 21, and checks whether or not the same data packet as the duplicate packet 612 is registered. In this example, because the data management table 1033 in FIG. 21 has an entry having the same GS and FID as those in FIG. 22, it is determined that the same data packet is registered.

When the same data packet is not registered in the data management table 1033 or the communication history table 1034 (NO in step 1301), the data packet process unit 1015 requests the transmission unit 1017 to transmit an Ack packet (step 1302). The transmission unit 1017 returns an Ack packet to the LS of the received data packet.

Next, the data packet process unit 1015 selects a transmission destination LD, and registers the data packet in the data management table 1033 (step 1303), and requests the transmission unit 1017 to transmit the data packet (step 1304). The transmission unit 1017 transmits the data packet to the selected LD.

When the same data packet is registered (YES in step 1301), the data packet process unit 1015 checks whether or not the received data packet has already passed through the node 1001 (step 1305).

In the case of the duplicate packet 612 in FIG. 22, node f is recorded at the end of the route, meaning that the packet has not passed through node f before reaching the end of the route. In the case of the data packet in FIG. 23, node f is recorded as the third and last nodes on the route, meaning that the packet has already passed through node f. Accordingly, it is possible to check whether or not the packet has passed through the node 1001 by referring to the route of the received data packet.

When the data packet has already passed through the node 1001 (YES in step 1305), the loop route via the node 1001 has been formed, and the data packet process unit 1015 deletes the LD that was used previously from the route table 1035 (step 1307). Thereby, the sending of packets to a loop route is prohibited. Thereafter, the data packet process unit 1015 sends out a packet to a different route by executing the processes in and subsequent to step 1302.

When the data packet has not passed through the node 1001 (NO in step 1305), it is recognized that one of the data packet registered in the data management table 1033 and the received data packet is a duplicate packet of the other. Accordingly, the data packet process unit 1015 refers to the data management table 1033 so as to identify a duplicating node, which generated the duplicate packet, and requests the duplication report packet generation unit 1016 to generate a duplication report packet (step 1306). The duplication report packet generation unit 1016 generates a duplication report packet, and the transmission unit 1017 transmits the duplication report packet to the duplicating node.

Figure 24:
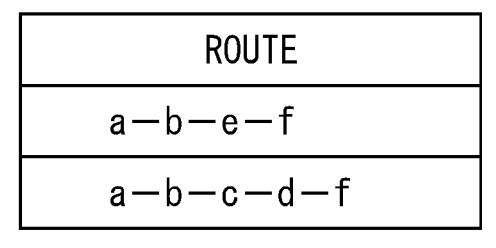

When the routes are compared between the data packet having "2" as the FID in FIG. 21 and the duplicate packet 612 in FIG. 22, the result illustrated in FIG. 24 is obtained. In such a case, checking a common portion between the two routes from node a as the GS to node f will lead to recognition that node b is the last node of the common portion and that the route is branched at this node b. Thereby, node b at the branching point for the two routes (branching node) is identified as a duplicating node.

FIG. 25 illustrates an example of the duplication report packet 613 that is transmitted when duplicating node b has been identified. In this example, the duplication report packet 613 includes the node ID of the duplicating node, a cause candidate, a GS, and an FID.

A cause candidate is a node ID representing a candidate (candidate node) for a causing node which is a cause of generation of the duplicate packet 612. In node f, it is not recognized which of the two same data packets is a duplicate packet, and accordingly it is not recognized which of the two routes illustrated in FIG. 24 has a problem in its link. Accordingly, nodes e and c, which are the nodes next to duplicating node b, are both described in the duplication report packet 613 as candidates for a causing node.

For transmitting the duplication report packet 613, a normal route for a data packet or the route through which the last data packet among a plurality of the same data packets was received is used.

FIG. 14 is a flowchart explaining an example of a duplication report packet reception process performed by the duplication report packet process unit 1012 in step 1107 illustrated in FIG. 11.

The duplication report packet process unit 1012 identifies the causing node, which caused the duplicate packet, by referring to the communication history table 1034 (step 1401).

When a duplication report packet includes a cause candidate, a plurality of entries corresponding to data transmission processes for a plurality of candidate nodes are extracted from the communication history table 1034. The process type of an extracted data transmission process includes transmission and indirect transfer. The LD of the entry having the earliest transmission time among the extracted entries is identified as the causing node.

For example, in node b that received the duplication report packet 613 illustrated in FIG. 25, two entries of data transmission processes having candidate nodes e and c respectively as LDs are extracted from the communication history table 1034 illustrated in FIG. 19. In such a case, the process type of the entry having candidate node e as the LD is transmission, while the process type of the entry having candidate node c as the LD is indirect transfer. From among the two entries, node e, which is the LD of the entry having the earlier transmission time, is identified as the causing node.

Next, the duplication report packet process unit 1012 increments the number of times of reporting the entry corresponding to the causing node in the link table 1031 (step 1402), and compares the number of times of the reporting with a threshold (step 1403).

When the number of times of reporting has not exceeded the threshold (YES in step 1403), the monitoring flag in the link table 1031 is changed to "1", and the node 1001 transitions to the monitoring mode (step 1404). When the number of times of reporting is equal to or smaller than the threshold (NO in step 1403), the node 1001 does not transition to the monitoring mode.

FIG. 26 illustrates an example of entries in the link table 1031 stored in node b. In this example, a link, the number of times of reporting, a monitoring flag, TTW1, and TTW2 are presented from among pieces of information included in an entry.

A link is identification information of a link between the node 1001 and an adjacent node. As the identification information of the link, the node ID of a corresponding adjacent node, for example, is used. The number of times of reporting is the number of times of receiving a duplication report packet and identifying the adjacent node thereof as a causing node and a monitoring flag represents whether or not the node 1001 has transitioned to the monitoring mode for monitoring that link. When the monitoring flag is "1", the flag represents the monitoring mode while when the monitoring flag is "0", the flag represents the normal mode.

Node b increments the number of times of reporting of link e by one each time it receives a duplication report packet including node e as a cause candidate and identifies node e as a causing node. In a situation where the threshold of the number of times of reporting is "1", when the number of times of reporting that has been incremented has become two, the monitoring flag of link e is changed to "1", and the node 1001 transitions to the monitoring mode for link e.

Upon the above transition, TTW1 is set to the time obtained by adding the check interval to the current time, and TTW2 is set to the time obtained by adding the monitoring mode continuation time to the current time. The check interval is set in such a manner that the higher the speed at which the transmission success rate of an Ack packet changes, the narrower the check interval. Thereby, it is possible to control a response method highly accurately by increasing the number of times of checking when there are great changes in the communication conditions.

Thereafter, when the current time is identical to set TTW1 in step 1102 in FIG. 11, the transmission unit 1017 transmits the check request packet 901 to causing node e as illustrated in FIG. 9. The check request packet 901 includes the communication history between duplicating node b and causing node e.

FIG. 27 illustrates an example of a communication history included in the check request packet 901. In this example, from among entries included in the communication history table 1034 in FIG. 19, an entry including node e as the LS or the LD is extracted and is included in the check request packet 901.

The check request packet 901 includes transmission or reception records of past m packets. m is an integer equal to or greater than one, and maybe set beforehand in accordance with the speed at which the propagation environment of the communication network changes or may be set in accordance with the current communication conditions.

As the check request packet 901, an existing Hello packet may be used. In such a case, a communication history is added to a Hello packet. However, the transmission intervals of Hello packets are shorter than those of data packets, and therefore it is desirable that the check intervals be adjusted by adding a communication history to a Hello packet only once in a plurality of times.

Figure 15:
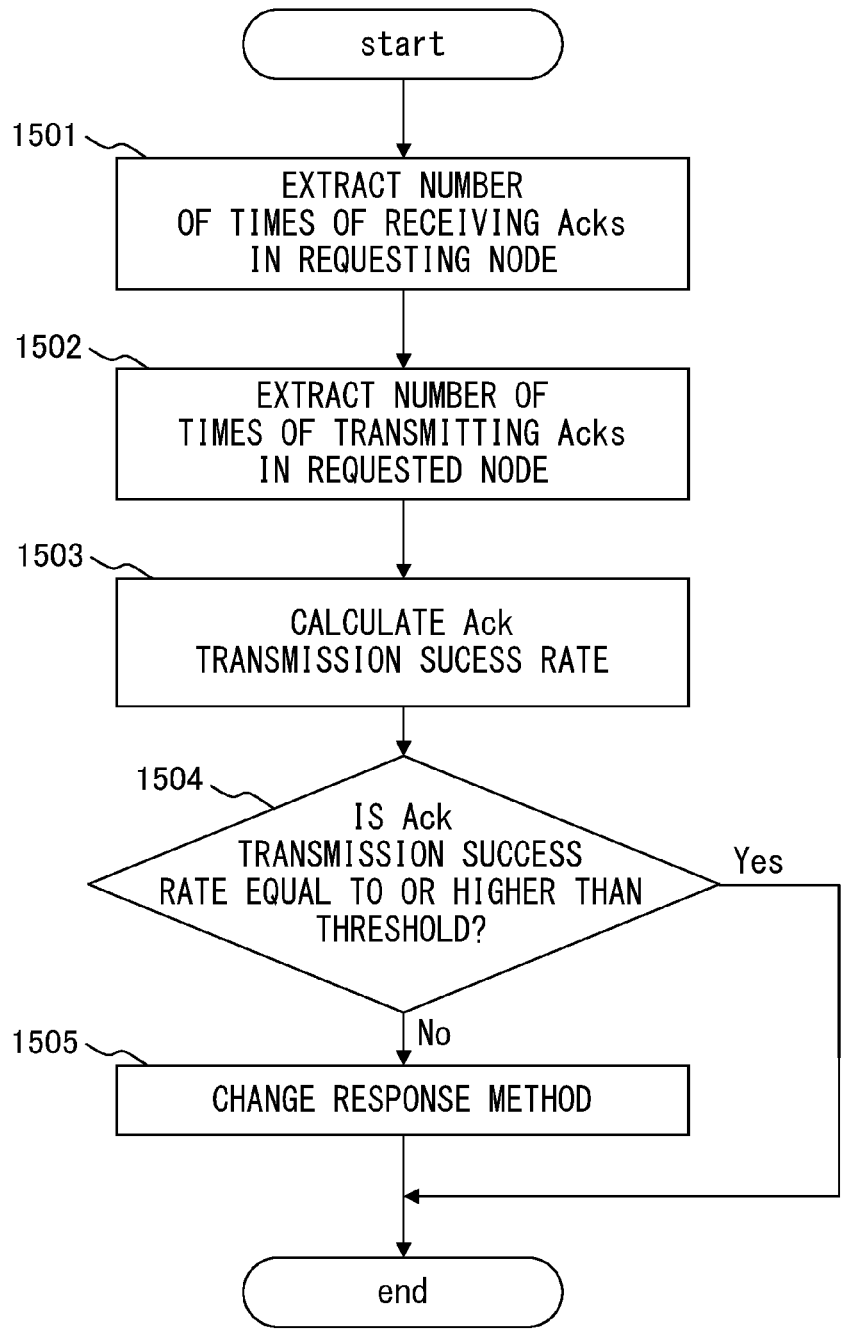
FIG. 15 is a flowchart for a check request packet reception process.

FIG. 15 is a flowchart illustrating an example of a check request packet reception process performed by the check request packet process unit 1013 in step 1106 illustrated in FIG. 11.

The check request packet process unit 1013 collates the communication history included in a received check request packet and the communication history table 1034, and extracts, from the communication history included in the check request packet, the number of times of receiving Ack packets in the duplicating node, which is the requesting source (step 1501). Next, the check request packet process unit 1013 extracts, from the communication history table 1034, the number of times of transmitting Ack packets in the node 1001 in the same period (step 1502).

Thereafter, the check request packet process unit 1013 calculates the transmission success rate of Ack packets from the extracted numbers of times of receiving and transmitting (step 1503), and compares the obtained transmission success rate with a threshold (step 1504). When the transmission success rate is lower than the threshold (NO in step 1504), the check request packet process unit 1013 changes a response method used when a data packet is received from a duplicating node (step 1505). When the transmission success rate is equal to or higher than the threshold (YES in step 1504), the response method is not changed.

When the response method is changed in step 1505, the response method after the change is reported to the duplicating node. The duplicating node that has received this report resets TTW1 in the link table 1031 to the time obtained by adding the check interval to the current time. For example, the link table 1031 illustrated in FIG. 26 is updated in a manner illustrated in FIG. 28.

Thereafter, in the duplicating node, the link table 1031 is again referred to in step 1102 of FIG. 11, and when the current time is identical to TTW1 that was reset, the check request packet transmission process in step 1111 is performed again.

In node e, which has received the check request packet 901 illustrated in FIG. 9, the communication history in FIG. 27 included in the check request packet 901 is collated with the communication history table 1034 illustrated in FIG. 20. From the communication history illustrated in FIG. 27, it is recognized that the number of times of receiving an Ack packet is one, and from the communication history table 1034 illustrated in FIG. 20, it is recognized that the number of times of transmitting an Ack packet in node e is two.

Therefore, 0.5 is obtained as the transmission success rate of Ack packets by dividing the number of times of receiving Ack packets in node b by the number of times of transmitting Ack packets in node e. This transmission success rate of Ack packets represents the ratio of the number of Ack packets included in the communication history illustrated in FIG. 27 to the number of Ack packets included in the communication history table 1034 illustrated in FIG. 20. As the threshold of the transmission success rate, a real number within a range, for example, from 0.5 through 1.0, is used.

At this moment, an entry as illustrated in FIG. 29 is stored in the Ack transmission evaluation table 1032. "Node" in FIG. 29 represents the node ID of the duplicating node, which is the transmission destination of an Ack packet, and "Ack transmission success rate" represents the transmission success rate of an Ack packet transmitted from node e to node b. When the threshold of the transmission success rate is 0.7, the response method is changed because the Ack transmission success rate is lower than the threshold.

According to the above check request packet reception process, it is possible to accurately calculate the transmission success rate of Ack packets during congestion by checking the communication histories in both of the nodes adjacent to the monitoring target link.

Also, a communication history, which is relatively large in volume, is only transmitted on a link that is a monitoring target without being exchanged between all nodes, and accordingly monitoring loads that are imposed on the communication network can be minimized. When check request packets including communication histories are transmitted during a period when data packets are not transmitted or received, the loads on the communication network are reduced further.

In the check request packet reception process illustrated in FIG. 15, the response method is changed only in accordance with the transmission success rate of Ack packets; however, the response method maybe changed also in accordance with other conditions. For example, the reception success rate of data packets may be used in addition to the transmission success rate of Ack packets.

In such a case, the check request packet process unit 1013 extracts, in step 1501, the number of receiving Ack packets and the number of transmitting data packets in the duplicating node, from the communication history included in the check request packet. Also, in step S1502, the check request packet process unit 1013 extracts the number of times of transmitting Ack packets and the number of times of receiving data packets in the node 1001 from the communication history table 1034.

In step 1503, the check request packet process unit 1013 calculates the transmission success rate of Ack packets and the reception success rate of data packets, and in step 1504, the check request packet process unit 1013 compares the transmission success rate of Ack packets with threshold T1 and the reception success rate of data packets with threshold T2.

When the transmission success rate of Ack packets is lower than T1 and the reception success rate of data packets is higher than T2, the check request packet process unit 1013 changes the response method. In such a case, because only the transmission success rate of Ack packets is low, it is considered that a duplicate packet was generated due to the response method.

When the transmission success rate of Ack packets is equal to or higher than T1 or the reception success rate of data packets is equal to or lower than T2, the response method is not changed. When the reception success rate of data packets is low, it is considered that the response method has no problems and other factors caused the generation of the duplicate packet.

For example, it is recognized that the number of transmitting data packets in node b is two from the communication history illustrated in FIG. 27 and that the number of receiving data packets in node e is two from the communication history table 1034 illustrated in FIG. 20.

Accordingly, 1.0 is obtained as the reception success rate of data packets by dividing the number of receiving data packets in node e by the number of transmitting data packets in node b. This reception success rate of data packets represents the ratio of the number of data packets included in the communication history table 1034 illustrated in FIG. 20 to the number of data packets included in the communication history illustrated in FIG. 27. As thresholds of T1 and T2, real numbers within a range, for example, from 0.5 through 1.0, are used.

At this moment, an entry as illustrated in FIG. 30 is stored in the Ack transmission evaluation table 1032. "Data reception success rate" in FIG. 30 represents the reception success rate of data packets transmitted from node b to node e. When T1=T2=0.7 is satisfied, the Ack transmission success rate is lower than T1 and the data reception success rate is higher than T2, and accordingly the response method is changed.

As alternative response methods in the causing node, the methods as follows are possible.

(1) A method in which transmission of an Ack packet is multiplexed.

According to this method, an Ack packet is transmitted a plurality of number of times from causing node e to duplicating node b. Thereby, the reachability of the Ack packet increases, leading to suppression of duplication of a data packet.

Figure 31:
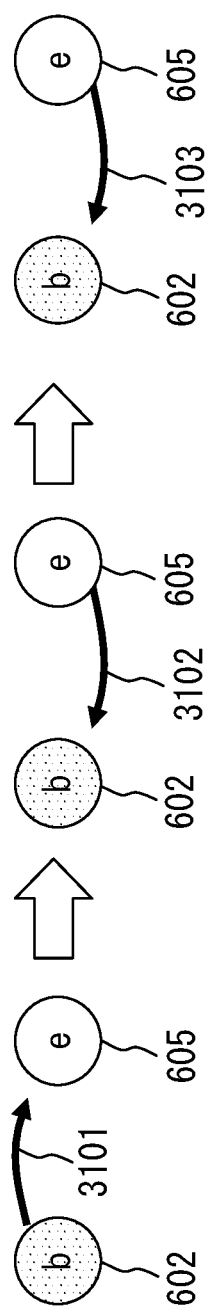
FIG. 31 illustrates a method of multiplexing transmission of an Ack packet.

For example, when the number of times of transmitting an Ack packet from node e to node b is changed to two, a first Ack packet 3102 is transmitted in return from node e to node b as illustrated in FIG. 31 after a data packet 3101 is transmitted from node b to node e. Next, a second Ack packet 3103 is transmitted in return.

In such a case, the number of times of transmitting and the number of times of receiving are counted for each of the multiplexed Ack packets. Thereby, even when the reachability of an Ack packet has been increased by multiplexing, the transmission success rate of Ack packets can be evaluated independently from such multiplexing.

For example, when congestion continues, the transmission success rate of Ack packets is kept low, and accordingly multiplexing is continued. The monitoring mode may be cancelled when the congestion is resolved and the transmission success rate of Ack packets becomes equal to or higher than the threshold. After the cancellation of the monitoring mode, the response method returns to a response method in which the transmission of an Ack packet is not multiplexed.

(2) A method in which transmission of an Ack packet is confirmed

Figure 32:
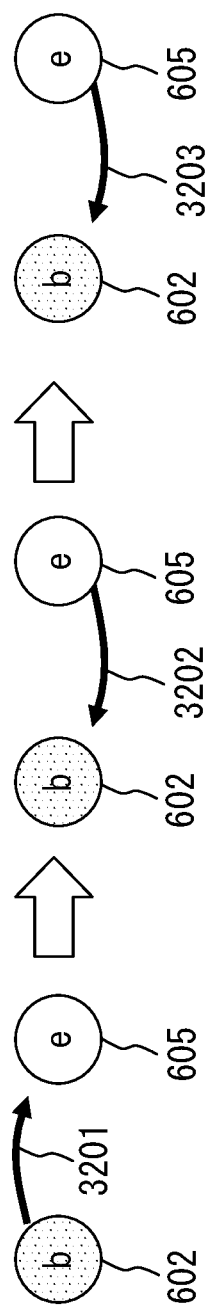
FIG. 32 illustrates a method of performing transmission confirmation of an Ack packet.

As illustrated in FIG. 32, according to this method, after a data packet 3201 has been transmitted from duplicating node b to causing node e, a first Ack packet 3202 is transmitted in return from node e to node b. Next, a second Ack packet 3203 indicating the reception of the first Ack packet 3202 is transmitted in return from node b to node e.

When node e does not receive the second Ack packet 3203, the first Ack packet is transmitted repeatedly from node e to node b until the second Ack packet 3203 is received. Thereby, the reachability of the first Ack packet increases, leading to suppression of the duplication of the data packet.

The monitoring mode may be cancelled when the number of times of repeated transmission becomes smaller than a threshold by recording the number of times of repeated transmission of the first Ack packet. After the cancellation of the monitoring mode, the method returns to a response method in which the transmission of an Ack packet is not confirmed.

(3) A method in which the transmission power of an Ack packet is adjusted

Figure 33:
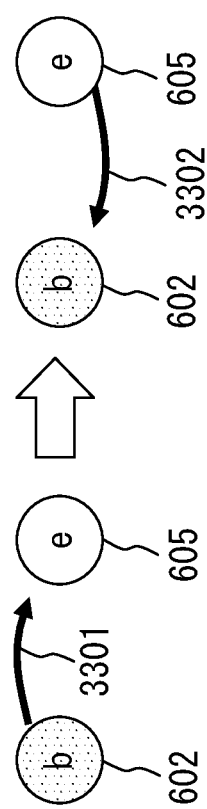
FIG. 33 illustrates a method of adjusting transmission power of an Ack packet.

As illustrated in FIG. 33, according to this method, after a data packet 3301 is transmitted from duplicating node b to causing node e, an Ack packet 3302 is transmitted in return from node e to node b with increased transmission power. Thereby, the reachability of the Ack packet increases, leading to suppression of the duplication of the data packet.

Thereafter, the monitoring mode maybe cancelled when the transmission success rate of Ack packets becomes equal to or higher than the threshold. After the cancellation of the monitoring mode, the transmission power of an Ack packet is decreased.

When above method (1), in which the transmission of an Ack packet is multiplexed, is employed as an alternative response method, the check request packet process unit 1013 multiplexes the transmission of an Ack packet by the following procedures, for example.

The check request packet process unit 1013 first determines the minimum integer k that satisfies the following expression, where ar is the transmission success rate of Ack packets calculated in step 1503 of FIGS. 15 and r0 is the threshold of the transmission success rate.

$$(1-(1-ar)^{**}k) > r0 \tag{1}$$

"**k" on the left of expression (1) represents a k-th power operation. For example, when ar=0.5 and r0=0.7 are satisfied, k=2 is satisfied, and when ar=0.5 and r0=0.8 are satisfied, k=3 is satisfied.

The check request packet process unit 1013 changes the response method by using obtained k as the degree of multiplexing an Ack packet in such a manner that each time a data packet is received an Ack packet is transmitted in return k times. The degree of multiplexing k may be determined on the basis of factors other than expression (1).

According to this multiplexing method, an Ack packet is multiplexed only in a section and a period with actual deterioration of link quality caused by congestion. Accordingly, Ack packets are reduced in sections and periods that do not need multiplexing, in comparison with a method in which Ack packets are multiplexed regularly in the entire communication network, leading to reduction in loads on the communication network.

Even when above method (2), in which the transmission of Ack packets is confirmed, is employed, Ack packets are transmitted repeatedly only in a particular section and period. Accordingly, loads on a communication network can be reduced in comparison with a method in which the transmission of Ack packets is confirmed regularly in the entire communication network.

Even when above method (3), in which the transmission power of an Ack packet is adjusted, is employed, the transmission power of an Ack packet is increased only in a particular section and period. Accordingly, power consumed by a communication network can be reduced in comparison with a method in which the transmission power of Ack packets is increased regularly in the entire communication network.

By increasing the transmission success rate of Ack packets from a causing node to a duplicating node by identifying, in a real time way, the duplicating node which generated a duplicate packet, the generation of duplicate packets can be suppressed reliably. Accordingly, worsening of congestion in a communication network can be suppressed at an early stage, eliminating the need for simulation for setting an appropriate response method in the entire communication network.

Further, by changing the threshold of the number of times of reporting in step 1403 in FIG. 14, the process of the monitoring mode can be adjusted appropriately. For example, when the threshold is set to be greater, the frequency and sections of transitioning to the monitoring mode can be reduced, leading to reduction in the loads on the communication network.

Also, by setting the threshold to be smaller, it is possible to increase the frequency and sections of transitioning to the monitoring mode, leading to reliable suppression of the generation of duplicate packets. Particularly, when the threshold has been set to zero, a duplicating node that has received a duplication report packet transitions to the monitoring mode and the transmission success rate of Ack packets is evaluated each time a duplicate packet has been detected. Thereby, the generation of duplicate packets can be suppressed by changing the response method.

Note that in the communication processes illustrated in FIG. 11 through FIG. 15, it is not always necessary to execute all steps, and some of the steps may be omitted in accordance with the configuration or conditions of a communication network. For example, when a loop route is not likely to be formed, the processes in steps 1305 and 1307 illustrated in FIG. 13 may be omitted. Also, when the node 1001 transitions to the monitoring mode immediately after identifying the causing node in step 1401 in FIG. 14, the processes in steps 1402 and 1403 may be omitted.

The nodes 501 through 503 illustrated in FIG. 5 and the node 1001 illustrated in FIG. 10 may be implemented by using, for example, an information processing apparatus (computer) as illustrated in FIG. 34. The information processing apparatus illustrated in FIG. 34 includes a Central Processing Unit (CPU) 3401, a memory 3402, an external storage device 3403, a medium driving device 3404, and a network connection device 3405. These components are connected to each other through a bus 3406.

The memory 3402 is a semiconductor memory such as, for example, a Read Only Memory (ROM), a Random Access Memory (RAM), a flash memory, etc., and stores programs and data used for communication processes. For example, the CPU 3401 (processor) executes a program by using the memory 3402 so as to perform communication processes.

In the case of the node 501 illustrated in FIG. 5, the CPU 3401 operates as the generation units 514 and 516, the identification unit 515, and the check unit 517. In the case of the node 502, the CPU 3401 operates as the generation units 524 and 526, the identification unit 525, and the check unit 527. In the case of the node 503, the CPU 3401 operates as the generation units 534, 536, the identification unit 535, and the check unit 537.

In the case of the node 1001 illustrated in FIG. 10, the CPU 3401 operates as the duplication report packet process unit 1012, the check request packet process unit 1013, the Ack packet process unit 1014, the data packet process unit 1015, the duplication report packet generation unit 1016, the mode process unit 1019, the retransmission process unit 1020, the check request packet generation unit 1021, and the control unit 1022.

The memory 3402 can be used as the storage units 513, 523, and 533 illustrated in FIG. 5, or as the storage unit 1018 illustrated in FIG. 10.

The external storage device 3403 is, for example, a magnetic disk device, an optical disk device, a magneto-optical disk device, a tape device, or the like. Examples of the external storage device 3403 also include a hard disk drive. The information processing apparatus can store programs and data in the external storage device 3403 so as to load them onto the memory 3402 to use them.

The medium driving device 3404 drives a portable recording medium 3407 so as to access information in it. The portable recording medium 3407 is, for example, a memory device, a flexible disk, an optical disk, a magneto-optical disk, or the like. Examples of the portable recording medium 3407 also include a Compact Disk Read Only Memory (CD-ROM), a Digital Versatile Disk (DVD), a Universal Serial Bus (USB) memory, and the like. An operator can store programs and data in the portable recording medium 3407 so as to load them onto the memory 3402 to use them.

As described above, examples of a computer-readable recording medium that stores programs and data used for communication processes include a physical (non-transitory) recording medium such as the memory 3402, the external storage device 3403, and the portable recording medium 3407.

The network connection device 3405 is a communication interface that is connected to a wired or wireless communication network for performing data conversion that accompanies communication. The information processing apparatus can receive programs and data from an external device via the network connection device 3405 so as to load them onto the memory 3402 to use them. The network connection device 3405 can also be used as the transmission units 511, 521, and 531, the reception units 512, 522, and 532 illustrated in FIG. 5, and as the reception unit 1011 or the transmission unit 1017 illustrated in FIG. 10.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A node in a network including a plurality of nodes, the node comprising:
   a transmission unit configured to transmit data to another node;
   a reception unit configured to receive data from another node;
   a memory configured to store a communication history between a plurality of other nodes and the node comprising the memory; and
   a processor configured to generate, when an acknowledgement response to data transmitted to a first node among the plurality of other nodes is not received from the first node, duplicate data of the transmitted data, and to refer to the communication history, identify the first node as a cause of generation of the duplicate data, to generate a check request that includes a communication history between the first node and the node comprising the memory and that requests the first node to check the communication history when a duplication report indicating detection of the duplicate data transmitted to a second node among the plurality of other nodes is received from one of the plurality of other nodes, and to instruct the transmission unit to transmit the check request when a number of times of receiving the duplication report and identifying the first node has exceeded a threshold.

2. The node according to claim 1, wherein:
   the duplication report includes identification information of a plurality of candidate nodes as a cause of generation of the duplicate data; and
   the processor identifies, as the first node, a transmission destination of an earliest data transmission process from among a plurality of data transmission processes for the plurality of candidate nodes included in the communication history between the plurality of other nodes and the node comprising the memory.

* * * * *